(12) United States Patent
Ohbi et al.

(10) Patent No.: US 7,706,229 B2
(45) Date of Patent: Apr. 27, 2010

(54) RECORDING MEDIUM HAVING DIFFERENT AREAS RECORDED WITH DIFFERENT MODULATION METHODS, RECORDING APPARATUS, REPRODUCING APPARATUS, RECORDING METHOD, AND REPRODUCING METHOD

(75) Inventors: Seiji Ohbi, Tokyo (JP); Masato Hattori, Kanagawa (JP)

(73) Assignee: Sony Corporation, Tokyo (JP)

( * ) Notice: Subject to any disclaimer, the term of this patent is extended or adjusted under 35 U.S.C. 154(b) by 1630 days.

(21) Appl. No.: 10/416,501

(22) PCT Filed: Sep. 11, 2002

(86) PCT No.: PCT/JP02/09278

§ 371 (c)(1),
(2), (4) Date: May 20, 2003

(87) PCT Pub. No.: WO03/028029

PCT Pub. Date: Apr. 3, 2003

(65) Prior Publication Data

US 2004/0047602 A1      Mar. 11, 2004

(30) Foreign Application Priority Data

Sep. 21, 2001   (JP) .............................. 2001-289380

(51) Int. Cl.
*G11B 7/00* (2006.01)
(52) U.S. Cl. ............... 369/59.13; 369/59.25; 369/47.16
(58) Field of Classification Search .............. 369/59.13, 369/59.25, 47.16
See application file for complete search history.

(56) References Cited

U.S. PATENT DOCUMENTS

| | | | | |
|---|---|---|---|---|
| 4,872,068 A | * | 10/1989 | Ishii et al. | 386/105 |
| 5,715,224 A | * | 2/1998 | Fujinami | 369/47.16 |
| 5,737,290 A | * | 4/1998 | Ohmori | 369/53.21 |

(Continued)

FOREIGN PATENT DOCUMENTS

EP          0 648 049 A1    4/1995

(Continued)

*Primary Examiner*—Wayne R Young
*Assistant Examiner*—LaTanya Bibbins
(74) *Attorney, Agent, or Firm*—Oblon, Spivak, McClelland, Maier & Neustadt, L.L.P.

(57) ABSTRACT

The present invention allows the compatibility with general-purpose data recording/reproducing by use of conventional media systems, and at the same time, allows the construction of a recording/reproducing system which satisfies the demands for the increase in storage capacity, the construction of a proper management system, the compatibility with special information recording, and the solving of problems with conventional models (recording/reproducing apparatuses). The audio track and data track in the data area are managed by the second management data in the management area on the recording medium and the data track records data and the first management data for managing the se data. In addition, the audio track and the second management data are modulated by the first modulating scheme and the data track is modulated by the second modulating scheme before being recorded.

27 Claims, 21 Drawing Sheets

U.S. PATENT DOCUMENTS

| | | | | |
|---|---|---|---|---|
| 5,838,666 | A * | 11/1998 | Igarashi et al. | 369/275.3 |
| 6,038,209 | A * | 3/2000 | Satoh | 369/275.3 |
| 6,070,799 | A * | 6/2000 | Ashe | 369/47.12 |
| 6,694,023 | B1 * | 2/2004 | Kim | 380/203 |
| 6,707,784 | B2 * | 3/2004 | Sako et al. | 369/275.3 |
| 6,879,637 | B1 * | 4/2005 | Nakagawa et al. | 375/253 |
| 7,239,603 | B1 * | 7/2007 | Ogata | 369/275.4 |
| 2007/0263509 | A1 * | 11/2007 | Park et al. | 369/53.12 |

FOREIGN PATENT DOCUMENTS

| | | |
|---|---|---|
| EP | 0 706 185 A1 | 4/1996 |
| EP | 0 750 307 A1 | 12/1996 |
| EP | 0 938 084 A2 | 8/1999 |
| EP | 0 938 084 A3 | 8/1999 |
| EP | 1 128 366 A2 | 8/2001 |
| EP | 1 128 366 A3 | 8/2001 |
| JP | 07-175592 | 7/1995 |
| JP | 09-259531 | 10/1997 |
| JP | 10-021673 | 1/1998 |
| JP | 10-241298 | 9/1998 |
| WO | WO 99/63424 | 12/1999 |
| WO | WO 99/63671 | 12/1999 |
| WO | WO 00/07300 | 2/2000 |

* cited by examiner

FIG. 1

|  | MINI DISC (MD DATA) | DISK OF PRESENT EMBODIMENT (HIGH DENSITY DATA) |
| --- | --- | --- |
| TRACK PITCH | 1.6 μm | 1.6 μm |
| BIT LENGTH | 0.59 μm/bit | 0.44 μm/bit |
| λ·NA | 780nm·0.45 | 780nm·0.45 |
| RECORDING | GROOVE RECORDING | GROOVE RECORDING |
| ADDRESSING | SINGLE SPIRAL DOUBLE-SIDE WOBBLE | SINGLE SPIRAL DOUBLE-SIDE WOBBLE |
| MODULATING | EFM | 1-7PP |
| ERROR CORRECTING | ACIRC | RS-LDC |
| INTERLEAVE | CONVOLUTION | COMPLETE BLOCK |
| REDUNDANCY | 46.3% | 20.50% |
| DETECTING | BIT-BY-BIT | PR(1, 2, 1)ML |
| LINEAR VELOCITY | 1.2m/s | 2.7m/s |
| DATA RATE | 133KB/s | 614KB/s |
| TOTAL CAPACITY | 164MB(140MB) | 297MB |
| CLUSTER CONFIGURATION (MINIMUM REWRITE UNIT) | 32 SECTORS + 4 LINK SECTORS | 16 SECTORS |

F I G. 2
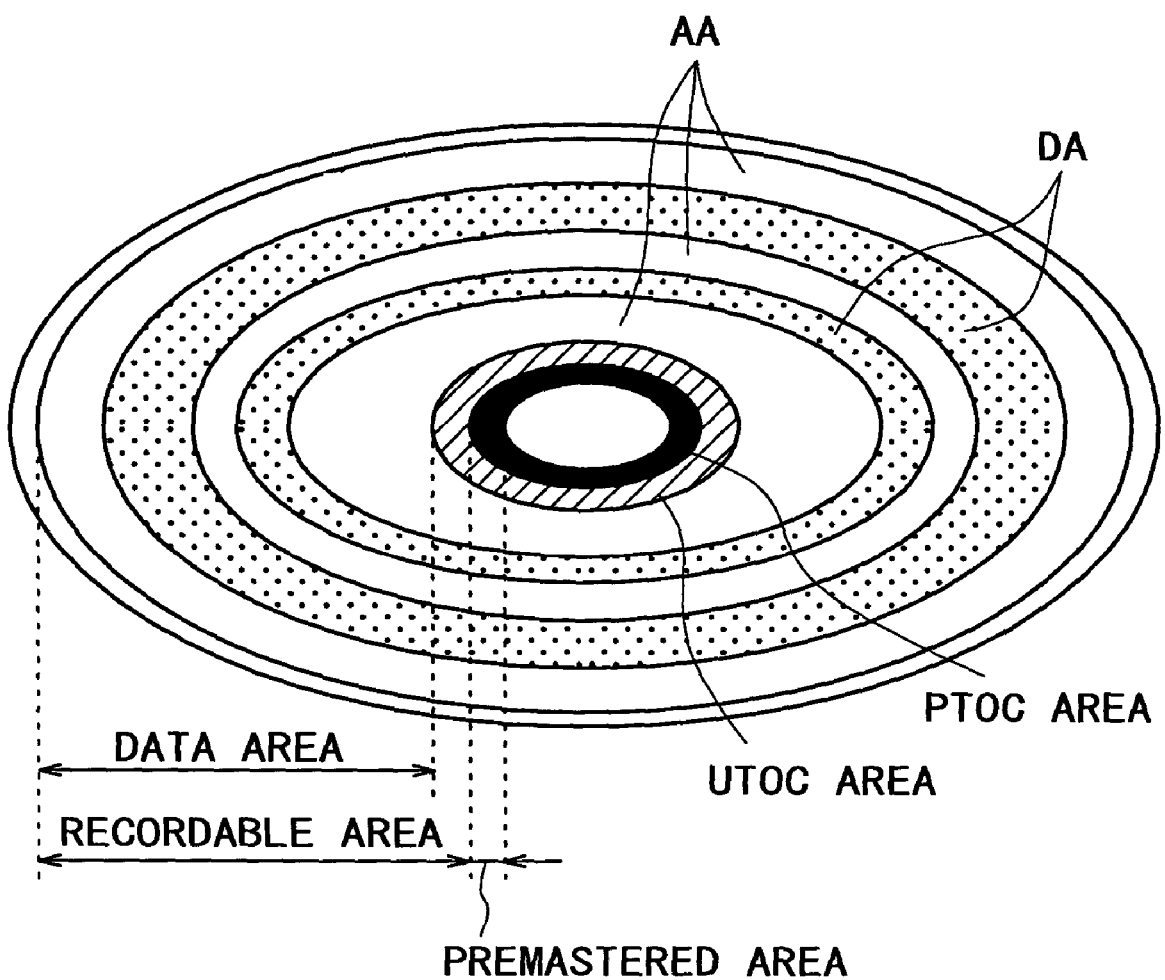

FIG. 6

| | 16 BITS | | 16 BITS | | |
|---|---|---|---|---|---|
| | MSB      LSB | MSB      LSB | MSB      LSB | MSB      LSB | |
| HEADER | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | CLUSTER | CLUSTER | SECTOR (00h) | MODE (02h) | 3 |
| | 00000000 | 00000000 | 00000000 | 00000000 | 4 |
| | 00000000 | 00000000 | 00000000 | 00000000 | 5 |
| | 00000000 | 00000000 | 00000000 | 00000000 | 6 |
| | MAKER CODE | MODEL CODE | FIRST TRACK NUMBER | LAST TRACK NUMBER | 7 |
| | 00000000 | 00000000 | 00000000 | SECTOR USAGE STATUS | 8 |
| | 00000000 | 00000000 | 00000000 | 00000000 | 9 |
| | 00000000 | 00000000 | 00000000 | DISK SERIAL NUMBER | 10 |
| POINTER BLOCK | DISK | ID | P-DFA | P-EMPTY | 11 |
| | P-FRA | P-TNO1 | P-TNO2 | P-TNO3 | 12 |
| | P-TNO4 | P-TNO5 | P-TNO6 | P-TNO7 | 13 |
| | P-TNO248 | P-TNO249 | P-TNO250 | P-TNO251 | 74 |
| | P-TNO252 | P-TNO253 | P-TNO254 | P-TNO255 | 75 |
| | 00000000 | 00000000 | 00000000 | 00000000 | 76 |
| | 00000000 | 00000000 | 00000000 | 00000000 | 77 |
| TABLE BLOCK (255 PARTS TABLES) | (01h) START ADDRESS | | | TRACK MODE | 78 |
| | END ADDRESS | | | LINK INFORMATION | 79 |
| | (02h) START ADDRESS | | | TRACK MODE | 80 |
| | END ADDRESS | | | LINK INFORMATION | 81 |
| | (03h) START ADDRESS | | | TRACK MODE | 82 |
| | END ADDRESS | | | LINK INFORMATION | 83 |
| | (FCh) START ADDRESS | | | TRACK MODE | 580 |
| | END ADDRESS | | | LINK INFORMATION | 581 |
| | (FDh) START ADDRESS | | | TRACK MODE | 582 |
| | END ADDRESS | | | LINK INFORMATION | 583 |
| | (FEh) START ADDRESS | | | TRACK MODE | 584 |
| | END ADDRESS | | | LINK INFORMATION | 585 |
| | (FFh) START ADDRESS | | | TRACK MODE | 586 |
| | END ADDRESS | | | LINK INFORMATION | 587 |

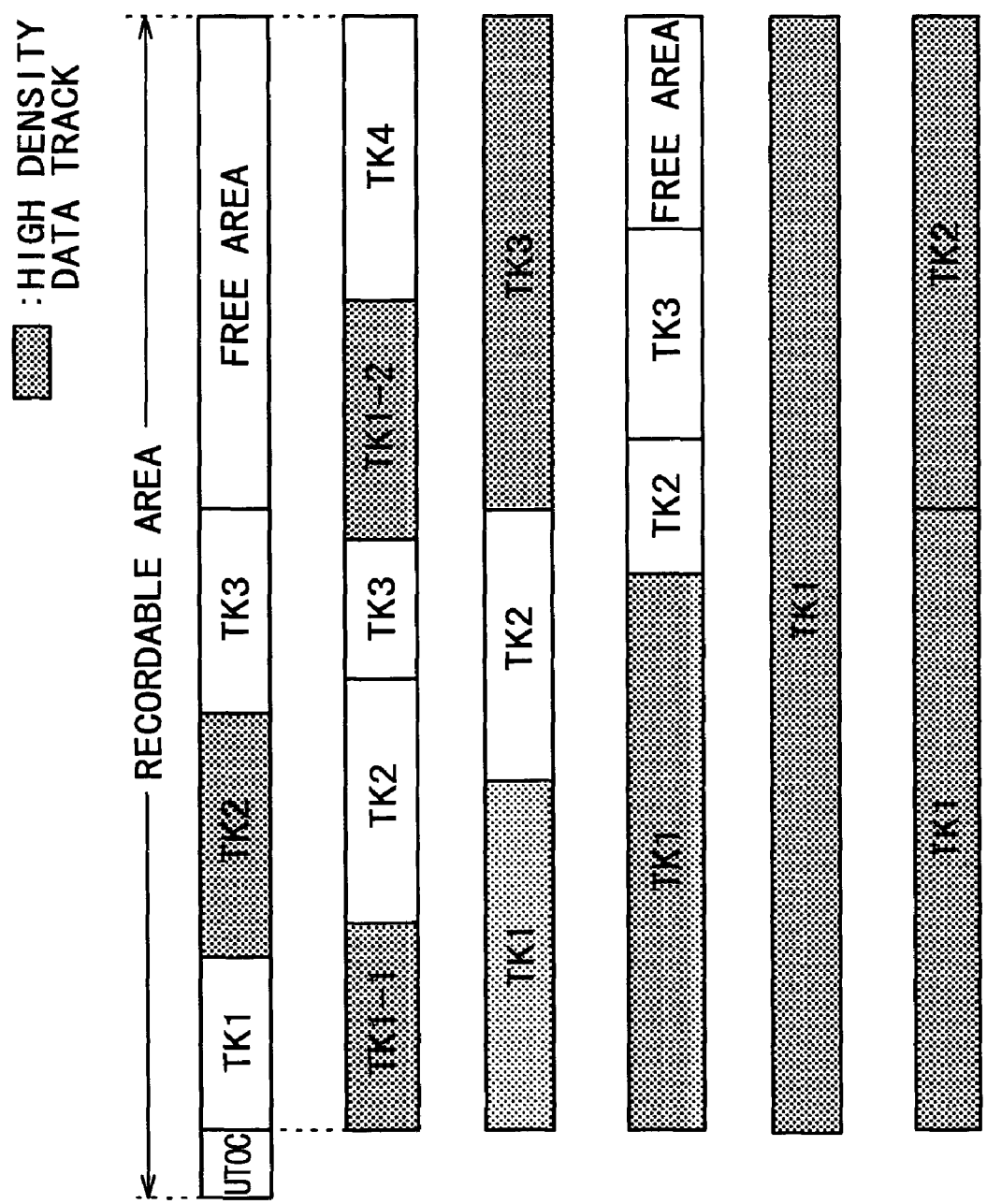

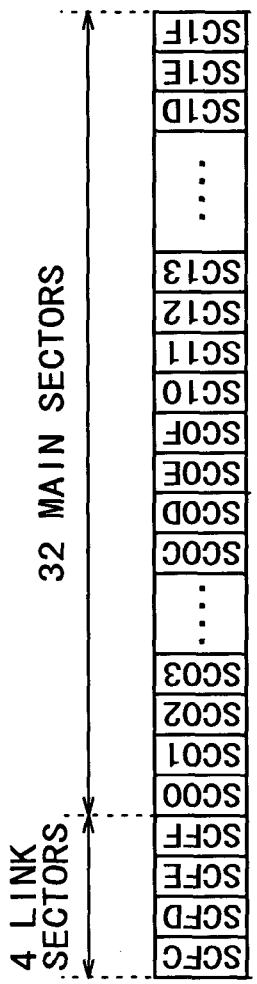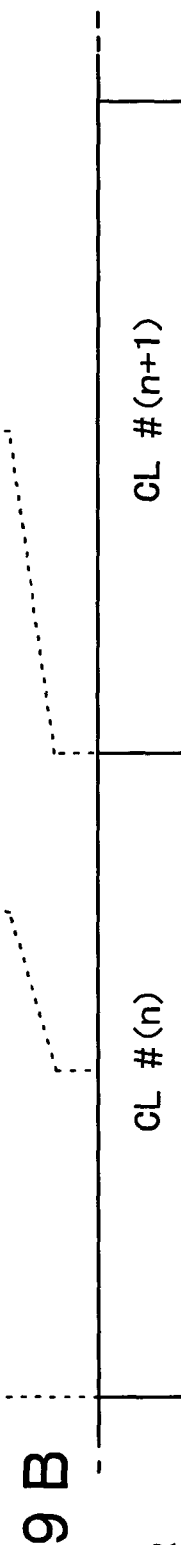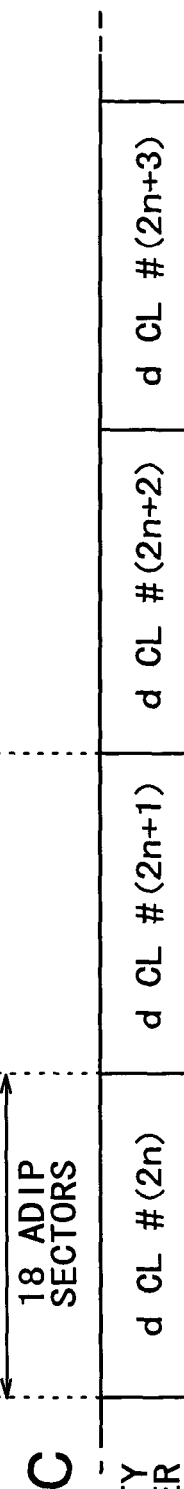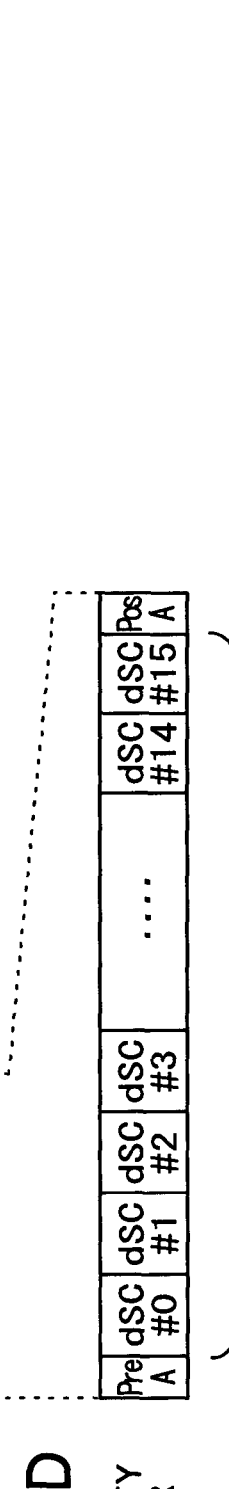
FIG. 9A ADIP SECTOR
FIG. 9B ADIP CLUSTER
FIG. 9C HIGH-DENSITY DATA CLUSTER
FIG. 9D HIGH-DENSITY DATA SECTOR

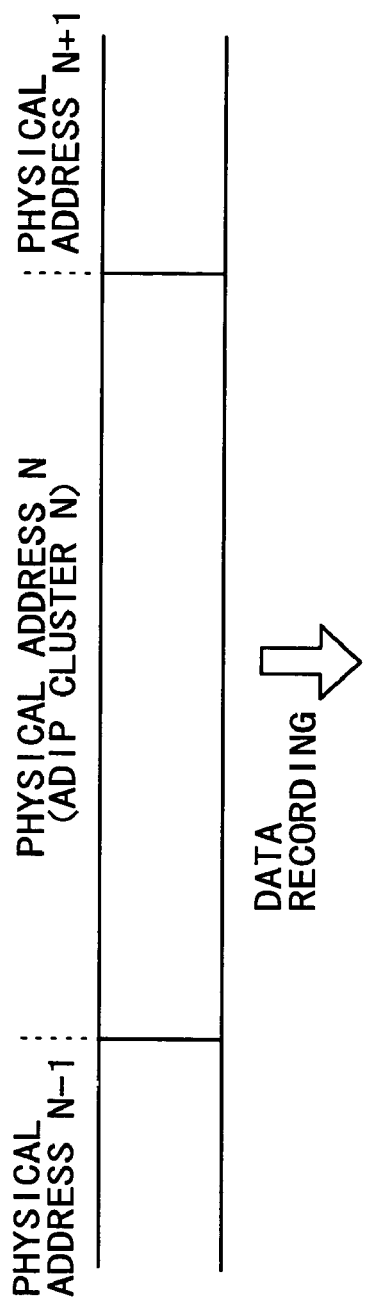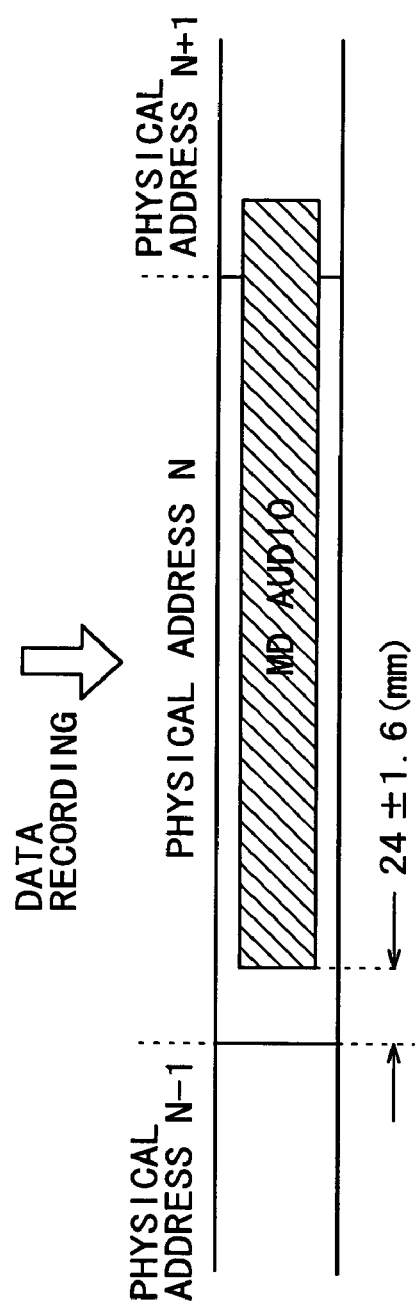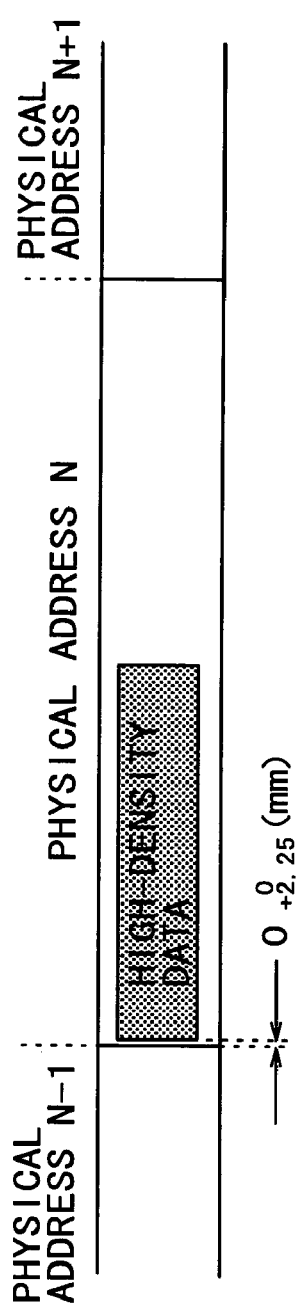

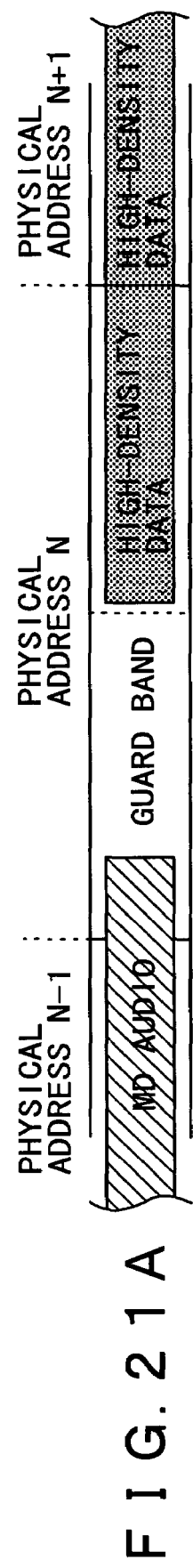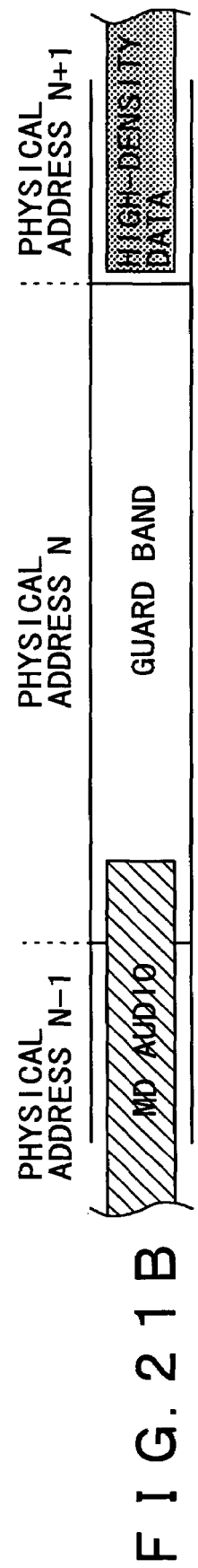

RECORDING MEDIUM HAVING DIFFERENT AREAS RECORDED WITH DIFFERENT MODULATION METHODS, RECORDING APPARATUS, REPRODUCING APPARATUS, RECORDING METHOD, AND REPRODUCING METHOD

TECHNICAL FIELD

The present invention relates generally to a recording medium suitably for use in a variety of uses and a recording apparatus, a reproducing apparatus, a recording method, and a reproducing method which correspond to the recording medium.

BACKGROUND ART

Various technologies have recently been appearing for increasing the storage capacities of recording media such as disks. It is also demanded to record various kinds of data such as audio data and computer data for example without restrictions.

In the development of general-purpose media, it is important to take the compatibility and integrity with conventional recording/reproducing apparatuses for example into consideration. Moreover, it is desired that the media be used effectively for existing resources.

In what follows, one of Mini Disc systems in wide use today is taken for example.

As well known, a Mini Disc system records and reproduces audio data such as music by use of a Mini Disc (MD), which is a magneto-optical disk having the diameter of 64 mm. In this case, audio data are recorded as compressed to ⅕ to ⅒ in size on the basis of an ATRAC method, one disk being able to record about 80 to 160 minutes of music data for example.

Because Mini Discs for audio use are easily available on the user side, it is preferable to apply Mini Discs to general-purpose uses other than music, for example, the data storage media for computers.

However, the following problems are preventing this application from being realized.

First, the recording capacity of the Mini Disc is relatively small, namely, about 160 MB.

Next, for the usage of the Mini Disc as a wide-range data storage, it is also supposed to use the Mini Disc for music and video distribution. However, the Mini Disc has no area for recording copyright protection information such as media-unique IDs that are required for the storage of distributed data for example, thereby failing to answer copyright protection requirements.

In addition, because control methods (P-TOC, U-TOC) based on unique control area other than the audio data recording area are employed, it is difficult to apply the Mini Disc to general-purpose file system using such as a FAT system for example.

Further, if data other than audio data are recorded to tracks under U-TOC management, many audio devices (MD players) suffer abnormal sounds at playback.

Namely, use of the audio Mini Disc for a general-purpose storage media is hampered by the problems associated with storage size, control system, special information such as copyright protection, compatibility and integrity with existing models.

It should be note that, for the purpose of recording data other than audio data in Mini Disc systems, disk standards generally referred to as "MD-DATA" and "MD-CLIP" have already been developed.

However, the MD-DATA standard cannot satisfy the above-mentioned requirements because a dedicated disk other than the audio MD is used and this standard is applicable to only dedicated recording/reproducing apparatuses corresponding to this standard and the recording capacity is only about 140 MB.

The MD-CLIP standard allows the use of audio MDs and uses the inner periphery portion of each MD, which is out of U-TOC control, thereby making this standard compatible with existing audio devices; however, that the general-purpose data recording area is only about 2 MB makes this standard to be limited in use.

DISCLOSURE OF INVENTION

It is therefore an object of the present invention to realize the demands for the compatibility with general-purpose data recording and reproduction by use of existing media systems, the increasing of storage capacity, the construction of proper control systems, the satisfaction of the demands for special information recording, and the solving of problems with existing models (recording/reproducing apparatuses).

In carrying out the invention and according to one aspect thereof, there is provided a recording medium having: a data area in which an audio track and a data track having data and first management data for managing the data; and a management area in which second management data for managing the audio track and the data track are recorded. The audio track and the second management data are modulated by a first modulating scheme and the data track is modulated by a second modulating scheme to be recorded together on the recording medium.

In this case, in the data area, the audio track and the data track are recordable at any given positions.

Alternatively, in the data area, an audio track recording area in which the audio track is recorded and a data track recording area in which the data track is recorded are set.

In this case, the recording medium is disc-shaped and the data track recording area is set further toward the inner periphery side than the audio track recording area.

On the above-mentioned recording medium, non-disclosed information is recorded out of the management by the first management data.

In carrying out the invention and according to another aspect thereof, there is provided a recording apparatus for a recording medium having a data area in which an audio track and a data track having data and first management data for managing the data, and a management area in which second management data for managing the audio track and the data track are recorded, the recording apparatus comprising: a first modulating means for modulating an information signal as the audio track and the second management data by a first modulating scheme to output first modulated data; a second modulating means for modulating an information signal as the data track by a second modulating scheme to output second modulated data; and a recording means for recording the first modulated data and the second modulated data outputted from the first modulating means and the second modulating means respectively to predetermined positions on the recording medium.

The above-mentioned recording medium is a disc-shaped recording medium having a mold-recorded address and a data unit obtained by converting the mold-recorded address by predetermined rules is a rewrite unit for rewriting the second modulated data to be recorded by the recording means.

In this case, an integral multiple of a sector which is the mold-recorded address unit is the rewrite unit for rewriting the second modulated data.

Further, the integral numbers of rewrite units for rewriting the second modulated data are included in a cluster which is the mold-recorded address unit.

In the above-mentioned recording apparatus, a control means is provided which, if a write request specifying a logical address for the data track is made, determines the rewrite unit including the logical address and causes the recording means to execute data writing in the determined rewrite unit.

Also, a control means is provided which causes the recording means to record non-disclosed information which is out of management by the first management data.

In the above-mentioned recording apparatus, the recording medium is a disc-shaped recording medium having a mold-recorded address, and an audio track recording area is set on the disk outer periphery side and an data track recording area is set on the disk inner periphery side in the data area, and a control means is provided which causes the recording means to record the audio track into the audio track recording area and the data track into the data track recording area.

Further, in the above-mentioned recording apparatus, a control means is provided which, if a component of the data track is physically continuously recorded to an end position of a component of the audio track in the data area, causes the recording means to start the recording from a position away from the end position by a predetermined distance.

In carrying out the invention and according to still another aspect thereof, there is provided a reproducing apparatus for a recording medium having a data area in which an audio track and a data track having data and first management data for managing the data, and a management area in which second management data for managing the audio track and the data track are recorded. The reproducing apparatus comprises: a reading means for reading data from the recording medium; a first demodulating means for demodulating modulated data as the audio track and the second management data, which are read by said reading means, by a first demodulating scheme; and a second demodulating means for demodulating modulated data as the data track by a second demodulating scheme.

In the above-mentioned reproducing apparatus, the recording medium is a disc-shaped recording medium having a mold-recorded address, and a control means is provided which, if a read request specifying a logical address for the data track is made, determines a mold-recorded address equivalent to the logical address and causes the reading means to access the logical address to read data from the disc-shaped recording medium.

In the above-mentioned reproducing apparatus, non-disclosed information being out of management by the first management data is recorded on the recording medium, and a control means is provided for causing the reading means to read the non-disclosed information on the basis of the second management data.

In the above-mentioned reproducing apparatus, the recording medium is a disc-shaped recording medium having a mold-recorded address, and an audio track recording area is set on the disk outer periphery side and a data track recording area is set on the disk inner periphery side in the data area and a control means is provided which causes the reading means to read modulated data as the audio track from the audio track recording area and modulated data as the data track from the data track recording area.

In carrying out the invention and according to yet another aspect thereof, there is provided a recording method for a recording medium having a data area in which an audio track and a data track having data and first management data for managing the data, and a management area in which second management data for managing the audio track and the data track are recorded. The recording method comprises the steps of: modulating an information signal of the audio track and the second management data by a first modulating scheme to record the modulated information signal to a predetermined position on the recording medium; and modulating an information signal of the data track by a second modulating scheme to record the modulated information signal to a predetermined position on the recording medium.

In the above-mentioned recording method, the recording medium is a disc-shaped recording medium having a mold-recorded address, and a data unit obtained by converting the mold-recorded address by predetermined rules is a rewrite unit for rewriting the data modulated by the second modulating scheme.

In the above-mentioned recording method, an integral multiple of a sector which is the mold-recorded address unit is the rewrite unit for rewriting the data modulated by the second modulating scheme.

In the above-mentioned recording method, the integral numbers of rewrite units for rewriting the data modulated by the second modulating scheme are included in a cluster which is the mold-recorded address unit.

The above-mentioned recording method further comprises the step of, if a write request specifying a logical address for the data track is made, determining the rewrite unit including the logical address and writing data in the determined rewrite unit.

The above-mentioned recording method still further comprises the step of recording non-disclosed information such that the non-disclosed information is out of management by the first management data.

In the above-mentioned recording method, the recording medium is a disc-shaped recording medium having a mold-recorded address. The recording method comprises the steps of: recording the audio track to the disk outer periphery side in the data area; and recording the data track to the disk inner periphery side in the data area.

The above-mentioned recording method yet further comprises the step of: if a component of the data track is physically continuously recorded to an end position of a component of the audio track in the data area, starting the recording from a position away from the end position by a predetermined distance.

In carrying out the invention and according to a different aspect thereof, there is provided a reproducing method for a recording medium having a data area in which an audio track and a data track having data and first management data for managing the data, and a management area in which second management data for managing the audio track and the data track are recorded. The recording method comprises the steps of: if, modulated data as the audio track and the second management data are read from the recording medium, demodulating the modulated data by a first demodulating scheme; and if modulated data as the data track are read from the recording medium, demodulating the modulated data by a second demodulating scheme.

In the above-mentioned reproducing method, the recording medium is a disc-shaped recording medium having a mold-recorded address. The reproducing method comprises the steps of: if a read request specifying a logical address for the data track is made, determining a mold-recorded address equivalent to the logical address; and reading data from the disc-shaped recording medium.

The above-mentioned reproducing method further comprises the step of: reading, on the basis of the second management data, the non-disclosed information recorded outside the management by the first management data.

In the above-mentioned reproducing method, the recording medium is a disc-shaped recording medium having a mold-recorded address. The reproducing method comprises the steps of: reading modulated data as the audio track from the disk outer periphery side in the data area; and reading modulated data as the data track from the disk inner periphery side in the data area.

Namely, in the present invention, the audio track and data track in the data area are managed by the second management data in the management area on the recording medium, and the data track records data and the first management data for managing these data.

Consequently, the data recording/reproducing based on the first management data such as a FAT system is enabled on the data track, thereby allowing the present invention to be used for general-purpose data recording applications.

Because the entire data track is managed by the second management data (for example, U-TOC in a Mini Disc system), the integrity with the audio track may be provided.

In addition, the audio track and the second management data are modulated by the first modulating scheme to be recorded and the data track is modulated by the second modulating scheme to be recorded. Consequently, the second modulating scheme capable of high-density recording may be employed in the data track, thereby increasing the storage capacity. Moreover, because the audio track and the data track are modulated by different modulating schemes, the conventional audio equipment compatible with the audio track may be prevented from reading the data track.

In addition, non-disclosed information which is out of management by the first management data may be recorded, thereby allowing the recording of the data required for copyright protection such as the information for media-unique ID (unique ID), data authentication and checking or encryption-associated information.

BRIEF DESCRIPTION OF DRAWINGS

FIG. 1 describes a disk practiced as an embodiment of the present invention.

FIG. 2 illustrates an area structure of the above-mentioned disk.

FIG. 6 describes U-TOC sector 0 of the above-mentioned disk.

FIGS. 8A to 8F illustrate an example of control by U-TOC of the above-mentioned disk.

FIGS. 9A to 9D illustrate an exemplary cluster structure of the above-mentioned disk.

FIGS. 19A to 19C illustrate MD audio recording and high-density data recording for ADIP clusters practiced as the embodiment of the present invention.

FIGS. 21A and 21B illustrate the linking rules practiced as the embodiment of the present invention.

BEST MODE FOR CARRYING OUT THE INVENTION

Figure 3:
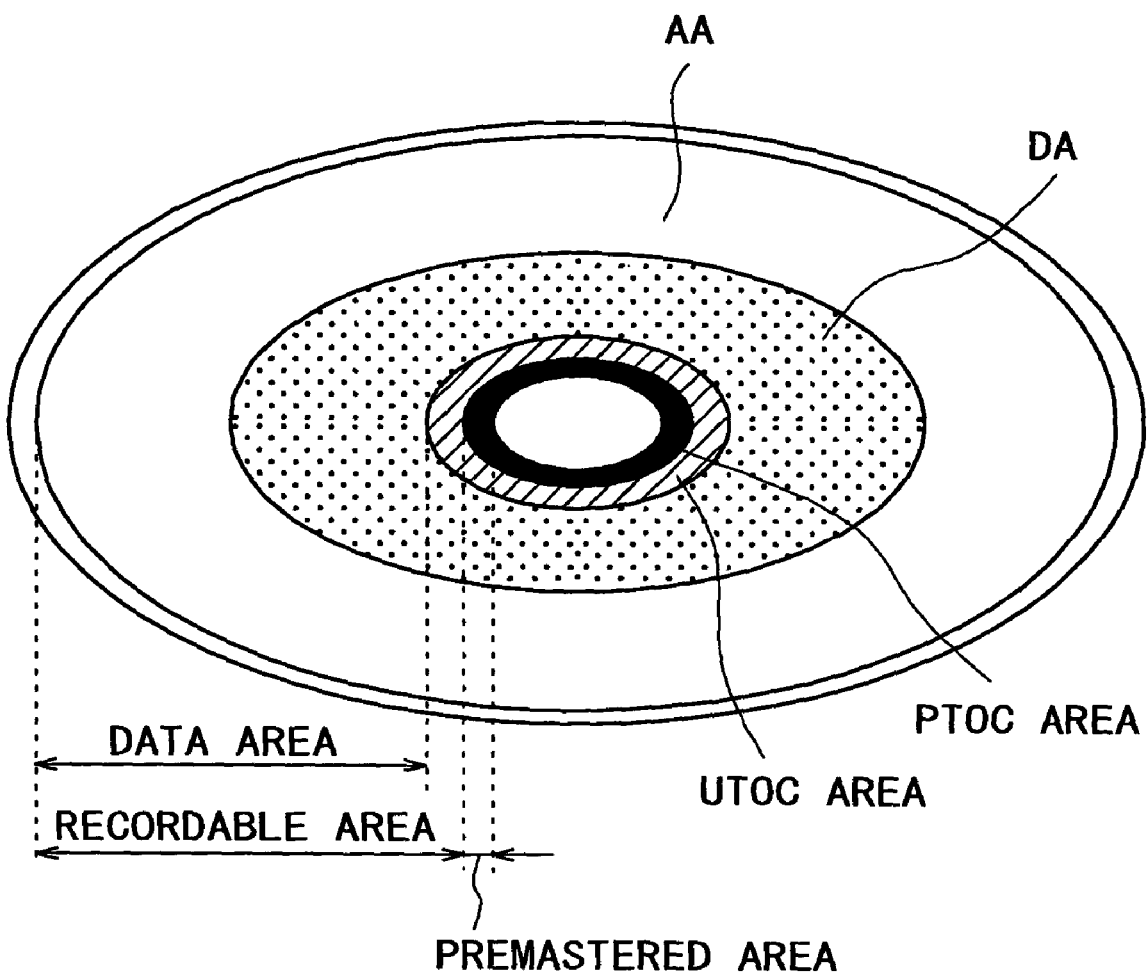
FIG. 3 illustrates an area structure of the above-mentioned disk.

The following describes a disk recording medium, a disk drive apparatuses (a recording apparatus, a reproducing apparatus), and recording and reproducing methods practiced as embodiments of the invention.

It is assumed that the above-mentioned embodiments of the invention be compatible with recording/reproducing systems (Mini Disc systems) based on the Mini Disc (MD), which is a magneto-optical disk on which data are recorded in a manner of magnetic field modulation.

The description will be made in the following order:
1. Disk specifications and area structure;
2. Disk management structure;
3. U-TOC;
4. Cluster structure;
5. FAT file system implementation example in data track;
6. Configuration of disk drive apparatus;
7. Data track sector read processing;
8. Data track sector write processing;
9. Writing/reading of non-disclosed information;
10. Linking rules.

1. Disk Specifications and Area Structure

The disk practiced as an embodiment of the present invention allows the recording of audio data on the disk of Mini Disc type in accordance with the conventional Mini Disc format, and at the same time, allows the recording of various kinds of data for computer use for example.

It should be noted that, for the convenience of description, terms "audio track," "data track," "MD audio data," and "high-density data" are used.

"Audio track" denotes one section of the audio data in conventional Mini Disc systems, which is equivalent to one piece of music for example. The audio data to be recorded as this audio track is compressed by ATRAC (Adaptive Transform Acoustic Coding) and demodulated by the "first modulating scheme" as ACIRC error correcting and EFM modulating. The audio data based on the first modulating scheme recorded on this "audio track" is referred to as "MD audio data."

"Data track" denotes a section (track) on which general-purpose data usable on personal computers and distribution systems for example are recorded. In "data track," a general-purpose file system such as the FAT file system is built, the details thereof to be descried later. The types of actual data to be recorded include a variety of software data for computer use, application programs, text files, image (moving/still) files, audio data files for music for example; namely, depending on use, the data track may be used to record all types of data.

The above-mentioned various types of data are recorded as the data based on "second modulating scheme" which realizes high-density recording by use of RLL(1-7) PP modulation, RS-LDC error correction, and Viterbi demodulation. The data based on the second modulating scheme to be recorded on "data track" are referred to as "high-density data."

It should be noted that RLL(1-7) modulation and RSLDC error correction as the second modulating scheme are disclosed in "Japanese Patent Laid-open No. Hei 11-346154" and "International Patent Publication WO 00/07300" for example.

Now, referring to FIG. 1, there is shown the comparison between the standard of the audio Mini Disc (and MD-DATA) and standard of the disk according to the present embodiment.

The Mini Disc (and MD-DATA) is formatted in a manner in which the track pitch is 1.6 μm and the bit length is 0.59 μm/bit. A laser wavelength λ=780 nm and an optical head numerical aperture NA=0.45.

For recording, groove recording is employed. Namely, grooves (on the disk surface) are used as tracks for recording and reproducing data.

For addressing, grooves (tracks) are formed based on single spiral and wobbles are formed on both side of each groove as address information, thereby providing wobbled grooves.

It should be noted that the absolute address recorded on the basis of wobbling are also referred to as ADIP (Address in Pregroove).

For recording data modulation, EFM (8-14 conversion) is employed. For error correction, ACIRC (Advanced Cross Interleave Reed-Solomon Code) is employed and convolution is employed for data interleaving. The redundancy of MD-DATA data is 46.3%.

For data detection, bit-by-bit detecting is employed. For disk driving, CLV (Constant Linear Velocity) is employed with the CLV linear velocity set to 1.2 m/s.

The standard data rate at recording/reproduction is 133 kB/s and the storage capacity is 164 MB (140 MB with MD-DATA).

The data unit called a cluster is the minimum rewrite unit of data. This cluster is composed of 32 main sectors and 4 link sectors, totaling 36 sectors.

On the other hand, in the case of the disk according the present embodiment, track pitch is 1.6 μm and bit length is 0.44 μm/bit, which is shorter than that of the audio Mini Disc.

However, laser wavelength λ=780 nm and optical head numeric aperture NA=0.45. Recording is groove recoding and addressing is wobbled groove addressing obtained by forming grooves (tracks) based on single spiral with wobbles as address information formed on both sides of each groove. Namely, in these points, the disk according to the present embodiment is the same as the audio Mini Disc and the optical system configuration, the ADIP address reading, and the servo processing in the disk drive apparatus are the same, thereby maintaining compatibility with the audio Mini Disc.

For recording data modulation, RLL (1, 7) PP (RLL: Run Length Limited, PP: Parity preserve/Prohibit rmtr (repeated minimum transition runlength) which is suitable for high-density recording is employed. For error correction, RS-LDC (Reed-Solomon-Long Distance Code) with BIS (Burst Indicator Subcode) having more powerful correction capability is employed. For data interleave, complete block type is employed. The redundancy of data is 20.50%.

For data detection, Viterbi decoding using partial response PR(1, 2, 1) ML is employed.

Disk driving is CLV with line velocity of 2.7 m/s. The standard data rate at recording/reproduction is 614 KB/s. The recording capacity is 297 MB.

Because modulation is based on RLL (1, 7) PP rather than EFM, window margin is 0.666 from 0.5, thereby enhancing recording density by 1.33.

In addition, because the physical format is based on RS-LDC with BIS, sector structure difference, and Viterbi decoding rather than CIRC, the data efficiency is enhanced from 53.7% to 79.5%, thereby realizing high-density recording 1.48 times as high.

In total, a data capacity 1.97 times (about 2 times) as high. Namely, the recording capacity of 297 MB, which is about double the recording capacity of the audio Mini Disc, is realized.

The cluster which is the minimum data rewrite unit is made up of 16 sectors.

It should be noted that, as described above, the disk of the present embodiment allows the recording of both audio tracks and data tracks. If audio tracks are recorded on the disk of the present embodiment, the modulating of MD audio data is EFM modulation and ACIRC as indicated in the case of the audio Mini Disc.

Figure 4:
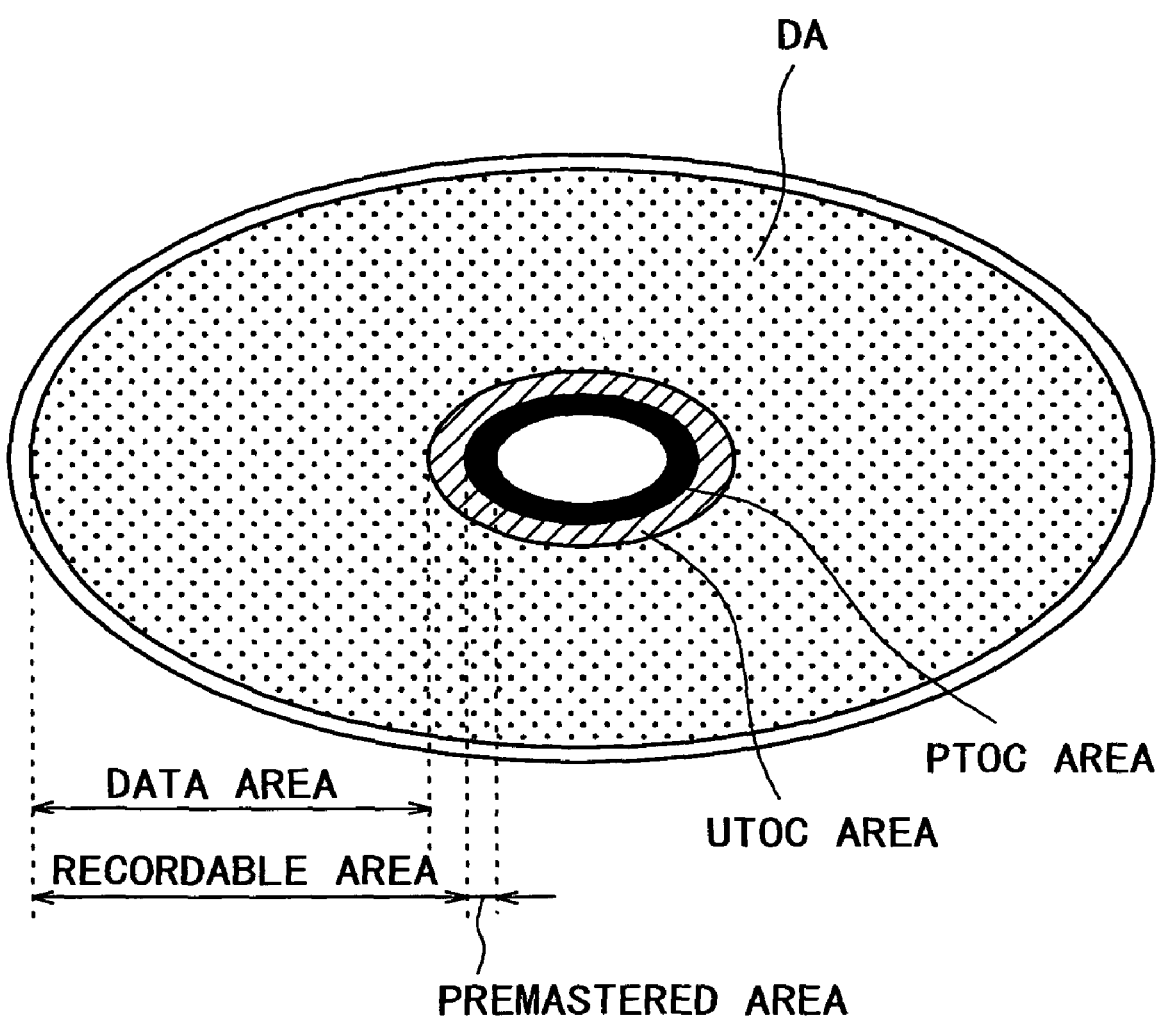
FIG. 4 illustrates an area structure of the above-mentioned disk.

Various area structure examples on the disk of the present embodiment are schematically shown in FIGS. 2, 3, and 4.

As shown in FIGS. 2, 3, and 4, the innermost side of the disk provides a P-TOC (Premastered TOC) area, which is a premastered area with respect to physical structure. Namely, reproduction-only data based on emboss pits are recorded in this area, in which P-TOC which is management information is recorded as the reproduction-only data.

An area around the premastered area provides a recordable area (a magneto-optically recordable area), which is a recordable/reproducible area with grooves formed as the guide grooves of record tracks.

The innermost periphery of this recordable area provides a U-TOC area.

Although its details are skipped, the U-TOC area has a buffer area which buffers the premastered area and a power calibration area for adjusting laser beam output power. U-TOC data are recorded repeatedly for three times in particular 3 clusters in the U-TOC area.

The details of the contents of U-TOC area will be described later. Each of 32 main sectors (SC00 through SC1F) in one cluster (the ADIP cluster to be described later) specifies a data format, thereby recording predetermined information. Namely, the U-TOC sector is specified so that the address of each track recorded in the program area and the address of the free area for example is recorded, and the track name attached to each track, recording date, and other information can be recorded.

In the recordable area, the outside of the U-TOC area provides a data area which is used to record audio tracks and data tracks.

The data area of the disk of the present embodiment is used in a manner in which audio tracks and data tracks are recorded together randomly.

In this case, as shown in FIG. 2 for example, in the data area, an audio recording area AA in which one or more audio tracks are recorded and a high-density data recording area DA in which one or more data tracks are recorded are formed at given locations. It should be noted that one audio track or one data track need not always be recorded physically continuously on the disk; one track may be recorded in a plurality of parts (a part is a section which is physically continuously recorded). Therefore, if two high-density data recording areas DAs exist at physically separated locations as shown in FIG. 2 for example, the number of data tracks may be one or more.

In another use of the disk of the present embodiment, the area in which audio tracks are recorded and the area in which data tracks are recorded may be arranged at different locations. For example, the area partitioning is performed by setting area partitioning by P-TOC management beforehand or by the initialization/formatting before the use of the disk.

In this case, as shown in FIG. 3 for example, the high-density data recording area DA in which one or more data tracks are recorded is located at the disk inner periphery side, and the audio recording area AA in which one or more audio tracks are recorded is located at the disk outer periphery side.

Thus, if the high-density data recording area DA and the audio recording area AA are separately arranged on the disk, the disk drive apparatus (recording/reproducing apparatus) performs recording/reproducing operations by accessing these areas after determining whether the data to be recorded/reproduced are MD audio data or high-density data.

It should be noted that, on the contrary to the example shown in FIG. 3, the disk outer periphery side may provide the high-density data recording area DA and the disk inner periphery side may provide the audio data recording area AA, or physically discrete plural high-density data recording areas DAs and physically discrete plural audio data recording area AAs may be formed.

However, if the high-density data recording area DA is set to the inner periphery side as shown in FIG. 3, it becomes advantageous in terms of access. The data tracks recorded in the high-density data recording area DA record data for computer use for example. This case is presumed that access is repeatedly performed in a data interval shorter than that of MD audio data. Because the disk of the present embodiment is based on CLV and the inner periphery side rotates in a shorter time than the outer periphery side, the rotational delay of the inner periphery side is shorter than that of the outer periphery side in an access operation, thereby reducing access time.

In still another use form of the data area in the disk of the present embodiment, the entire data area may provide a high-density data recording area DA in which data tracks are recorded as shown in FIG. 4.

If audio tracks and data tracks are allowed to be arbitrarily recorded together as shown in FIG. 2, only the data tracks may eventually be recorded, resulting in the state shown in FIG. 4. As required, this disk may be configured beforehand as a disk dedicated to the recording of data tracks as shown in FIG. 4.

2. Disk Management Structure

Figure 5:
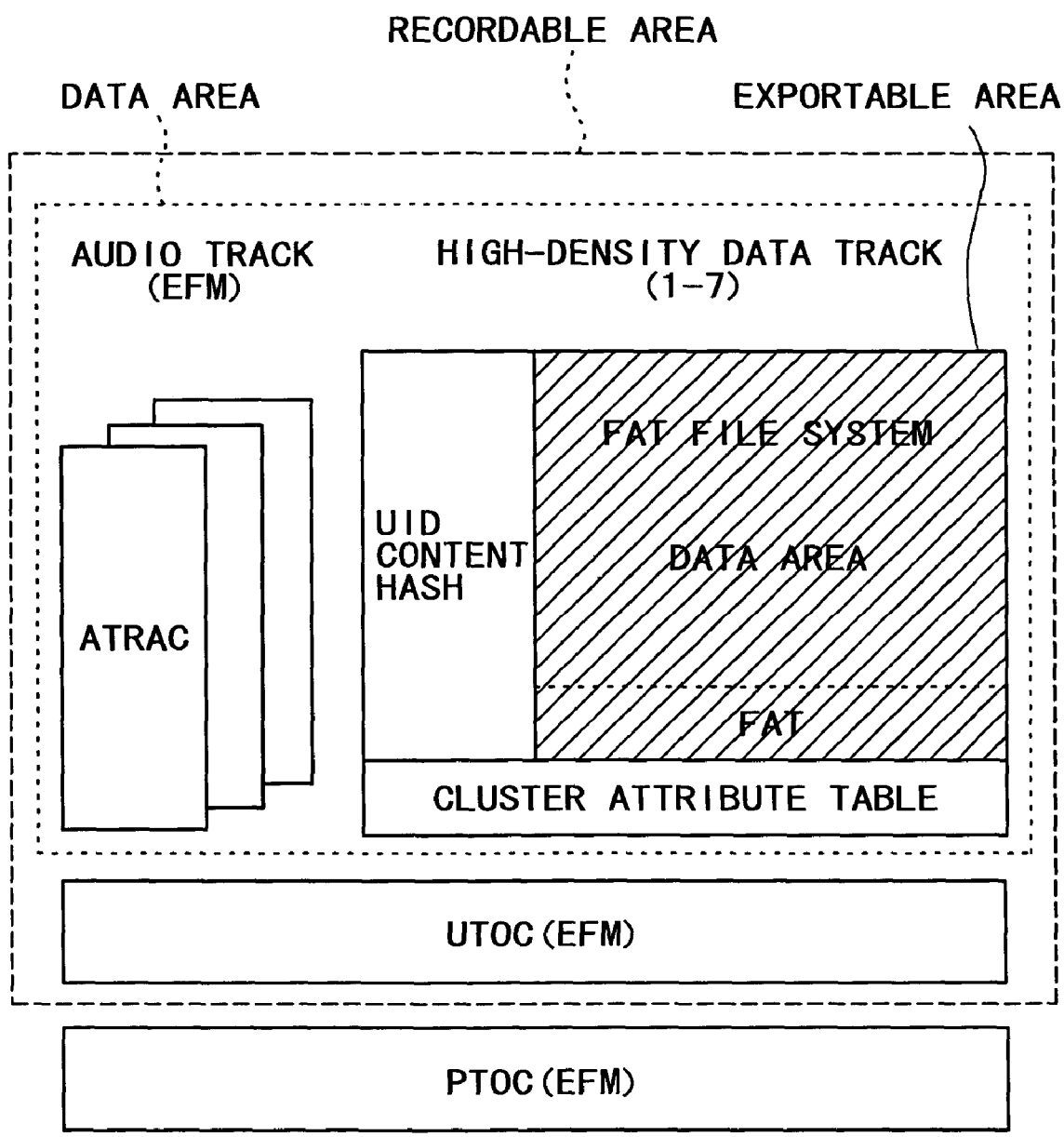
FIG. 5 illustrates a control structure of the above-mentioned disk.

The following describes a disk management structure of the disk of the present embodiment with reference to FIG. 5.

As described above, P-TOC and U-TOC employed by ordinary Mini Disc systems are recorded as management information.

P-TOC is recorded by pits as non-rewritable information. As disk basic information, P-TOC records disk's total storage capacity, U-TOC position in U-TOC area, position of power calibration area, start position of data area, and end position of data area (read-out position).

On the other hand, U-TOC recorded in the recordable area is the management information which is rewritten in response to the recording and deletion of tracks (audio tracks and/or data tracks), managing the start position, end position and mode of each track (parts which form a track). U-TOC also manages a free area with no track recorded in the data area, namely a part as a writable area.

FIG. 5 shows a state in which three audio tracks and one data track exist in the data area, as an example. In this case, U-TOC manages each of these four tracks.

The three audio tracks are three pieces of music data for example, which are ATRAC-compressed and modulated by ACIRC and EFM (the first modulating scheme) into MD audio data tracks.

It should be noted that U-TOC and P-TOC are recorded in a method compliant with conventional Mini Disc systems; namely, the data as U-TOC and P-TOC are the data based on the first modulating scheme.

On the other hand, the data track is a track formed by the high-density data modulated by RS-LDC and RLL(1-7) PP (the second modulating scheme).

On U-TOC, the entire data tracks are managed by one track independent of MD audio data, the details thereof to be described later.

Namely, U-TOC manages one or more part positions as the entire data tracks on the disk.

Each data track is formed with a high-density data cluster to be described later as the minimum recording unit, the details thereof to be described later.

Each data track records a cluster attribute table (hereafter referred to as "CAT") which manages the high-density data cluster included in that data track. CAT manages the attributes (disclosure enabled/disabled, normal/abnormal, etc.) for each of the data high-density data clusters which form the data track.

By use of the high-density data clusters which is not disclosed in the data track, a disk unique ID (UID) and a hash value for checking data modification for copyright protection for example are recorded. Obviously, various other non-disclosed information may be recorded.

This non-disclosed area may be accessed only by especially licensed equipment.

The area (exportable area) independent of the high-density data cluster which may be disclosed on a data track is accessed by an external computer for example via a general-purpose data interface such as USB or SCSI to use as a recording area.

In the case of FIG. 5 for example, a FAT file system based on FAT and FAT management data file is constructed in the exportable area.

Namely, the data recorded in the exportable area are managed not by U-TOC but by the general-purpose management information such as FAT, providing the data that can be recognized by external computers for example not compliant with the Mini Disc system.

It should be noted that a plurality of data tracks having the above-mentioned structure may be recorded on the disk. In such a case, each of the data tracks is managed by U-TOC as one track and the data in the exportable area in each track are managed by FAT for example. For example, each data track uniquely has a FAT file system. Alternatively, one FAT file system may be recorded over a plurality of data tracks.

In the above, the information including a unique ID is recorded in the data track and not managed by FAT. AS long as not managed by FAT, this information may be recorded in any logical form. For example, this information may be recorded in a newly arranged track to be directly managed by U-TOC for recording non-disclosure information or may be recorded in U-TOC and/or P-TOC. In addition, for this information, a recording area for non-disclosed information may be arranged by use of a portion not used by U-TOC in the U-TOC area.

3. U-TOC

The following describes the managing by U-TOC.

U-TOC manages, on a track basis, the tracks based on MD audio data and the tracks based on high-density data recorded on the disk.

As described above, in the Mini Disc system, ADIP based on wobbling groove is attached as a physical address, and as for the data of audio track (namely a music track for example in the conventional Mini Disc system), the cluster specified by ADIP (the ADIP cluster) provides the minimum rewrite unit.

The structure of this cluster will be described later. One ADIP cluster is composed of 32 main sectors and four link sectors, totaling 36 sectors (ADIP sector of 2352 bytes). The physical address as ADIP is assigned on a sector basis. Namely, the physical address is composed of ADIP cluster address as the upper value and ADIP sector address as the lower value.

U-TOC data are recorded in a particular ADIP cluster in the above-mentioned U-TOC area.

The contents of the U-TOC data are defined in each sector in the ADIP cluster concerned.

U-TOC sector 0 (the start ADIP sector in the ADIP cluster concerned) manages the tracks and free areas as parts.

U-TOC sector 1 and sector 4 manage character information for each track.

U-TOC sector 2 manages recording date for each track.

In what follows, only U-TOC sector 0 will be described by skipping the description of sector 1, sector 2 and sector 4.

U-TOC sector 0 is a free area which can record audio tracks of recorded music for example and new tracks and a data area which records the management information for each data track.

For example, when recording a track to the disk, the disk drive apparatus searches the U-TOC sector 0 for the free area on the disk and records data (MD audio data or high-density data) in the retrieved free area. At playback, the disk drive apparatus searches U-TOC sector 0 for the area in which the track to be reproduced is recorded and accesses the retrieved area to perform a playback operation.

FIG. 6 shows the structure of U-TOC sector 0.

The data area (4 bytes×588=2352 bytes) of U-TOC sector 0 records a synchronous pattern formed with 1-byte data with the start position being all 0s or all 1s.

Next, for the values corresponding to ADIP address, a cluster address (Cluster H and Cluster L) and a sector address (Sector) are recorded over three bytes, followed by one byte of mode information (MODE), forming the header. These 3-byte addresses provide the address of that sector itself.

Next, at predetermined byte positions, maker code, model code, track number of first track (First TNO), track number of last track (Last TNO), sector usage status (Used sectors), disk serial number, and disk ID are recorded.

In addition, an area in which various pointers (P-DFA, P-EMPTY, P-FRA, and P-TNO1 through P-TNO255) is arranged as a pointer section in order to identify the area of tracks (music for example) recorded by the user and the free area by relating them to a table section to be described later.

For the table section which is to be related to the pointers (P-DFA through P-TNO255), 255 part tables (01h) through (FFh) are arranged, each part table recording the start address and end address providing the origin and termination for a particular part and the mode information (track mode) for that particular part. The start address and the end address are the values equivalent to the cluster/sector addresses as the ADIP address. Further, because a part indicated by each part table may be linked to another part, the link information indicative of the part table recording the start and end addresses of the linked part may be recorded.

It should be noted that a part denotes a track portion in which data are physically continuously recorded in one track.

The address indicated by start address and end address provides the address indicative of each of one or more parts which form one piece (track) of music.

In the recording/reproducing apparatus of this type, if one track of data such as music data is recorded physically discontinuously on the disk, namely over a plurality of parts, the recorded music data are reproduced by linking the part in a sequential manner, thereby ensuring a correct reproducing operation, so that the music data for example to be recorded by the user may be recorded by dividing them into a plurality of parts for the efficient use for example of the recordable area.

For this purpose, link information is provided for linking part tables by specifying the part tables to be linked on the basis of part table numbers (01h) through (FFh).

To be more specific, in the table section of U-TOC sector 0, one part table represents one part; for music data composed of three linked parts for example, its part positions are managed by the three part tables linked on the basis of the link information.

It should be noted that, actually, the link information is indicated by numeric values indicative of byte positions in U-TOC sector 0 by a predetermined computation process. Namely, the part tables are specified as 304+(link information)×8 (byte position) The part tables (01 h) through (FFh) each indicate its contents by the pointers (P-DFA, P-EMPTY, P-FRA, and P-TNO1 through P-TNO255) in its pointer section as follows.

Pointer P-DFA is indicative of a defective area on the disk, specifying one part table or the start part table of a plurality of part tables indicative of a track portion (=part) presenting a defective area caused by scratch for example. Namely, if a defective part exists, pointer P-DFA records the defective one of (01h) through (FFh) and the corresponding part table indicates the defective part by the start and end addresses. If there is another defective part, another part table is specified as the link information in the part table thereof, this part table also indicating the defective part. If there is no other defective part, the link information is "00h" for example, indicating that there is no further link.

Pointer P-EMPTY indicates one unused part table or the start part table of a plurality of unused part tables in the table section. If an unused part table exists, as a pointer P-EMPTY, one of (01h) through (FFh) is recorded.

If there are two or more unused part tables, the part tables are sequentially specified on the basis of the link information starting with the part table specified by pointer P-EMPTY to link all unused part tables in the table section.

Pointer P-FRA indicates a free area (including a deleted area) to which data are writable on the disk, specifying one part table or the start table of a plurality of part tables indicative of a track portion (=part) which provides a free area.

Namely, if there is a free area, pointer P-FRA records one of (01h) through (FFh) and the corresponding part table indicates the start and end addresses of the part providing the free area. If there are two or more parts, namely, if there are two or more part tables, these part tables are sequentially specified by the link information until the part table of "00h" is reached.

Figure 7:
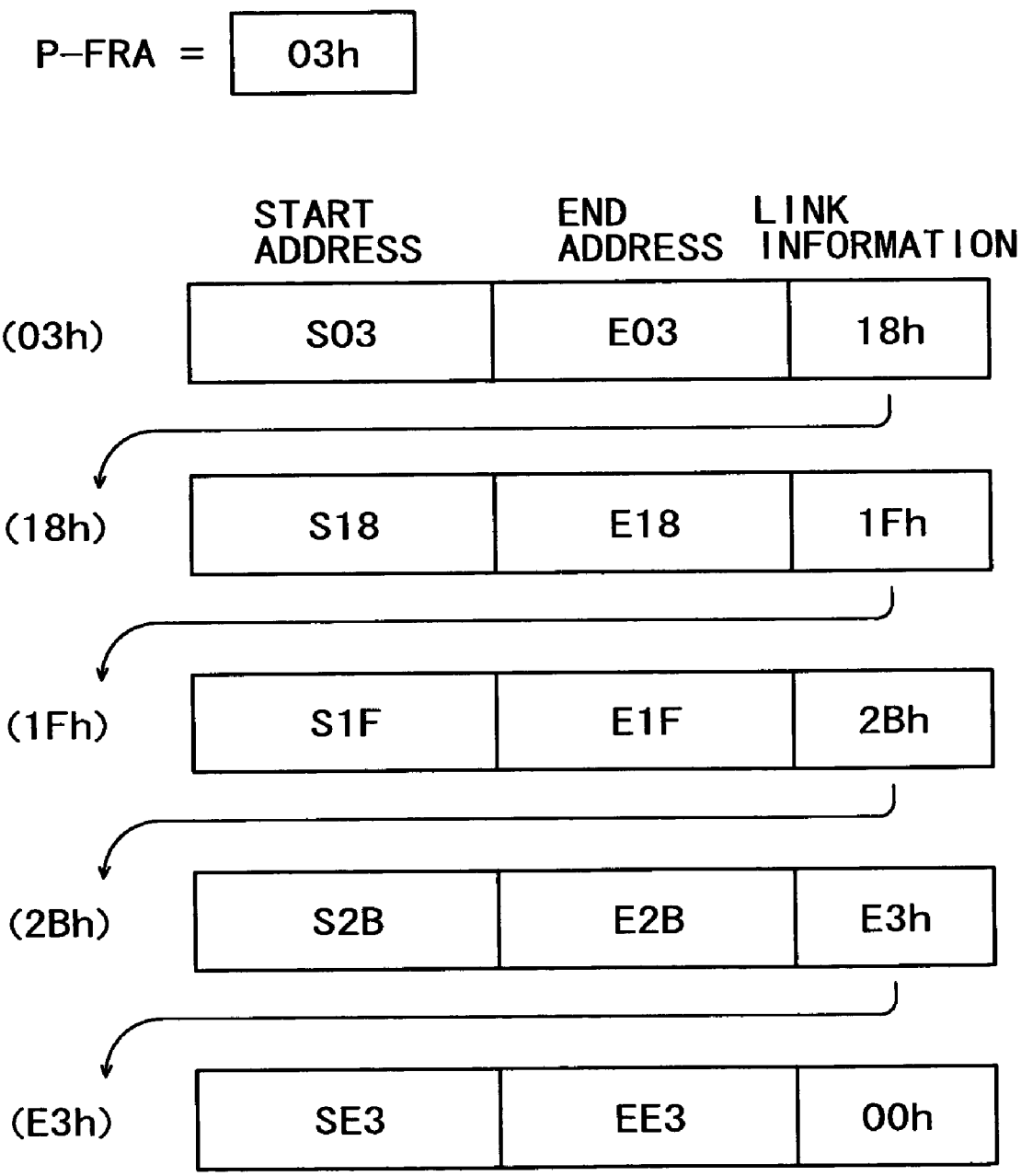
FIG. 7 illustrates a link form of U-TOC sector 0 of the above-mentioned disk.

FIG. 7 schematically shows a status of managing, by the part table, parts which provide free areas. This example shows that parts (03h), (18h), (1Fh), (2Bh), and (E3h) are free areas and this status is represented by pointer P-FRA by the link of part tables (03h), (18h), (1Fh), (2Bh), and (E3h). It should be noted that the above-mentioned defective areas and unused part tables are also managed in this manner.

Pointers P-TNO1 through P-TNO255 indicate the tracks recorded on the disk; for example, pointer P-TNO1 indicates the part table which indicates the part recorded with the data of the track 1 or the temporally starting part of a plurality of parts.

For example, If music data, which are track 1 (audio track), are recorded without being divided on the disk, namely, recorded as one part, the recording area of track 1 is recorded in the start and end addresses in the part table indicated by pointer P-TNO1.

In addition, if music data, which are track 2 (audio track), are discretely recorded in two or more parts on the disk, the parts for indicating the recording positions of track 2 are specified temporally sequentially. To be more specific, starting with the table specified by pointer P-TNO2, the other part tables are temporally sequentially specified on the basis of the link information, thereby lining the part tables up to the table in which the link information becomes "00h" (the same manner as shown in FIG. 7 above).

Thus, because all parts recorded with the data constituting music 2 are sequentially specified and recorded, continuous music information may be retrieved from the discrete parts or the recording by efficient use of the recording area may be executed by making the recording/reproducing head access these parts when reproducing music 2 or overwriting the recording area of music 2.

When a data track is recorded, the part table specified at particular point P-TNOx records the start and end addresses and track mode of this data track.

Obviously, if a data track is constituted by a plurality of parts, a plurality of part tables is managed by the link information for linking together as with audio tracks.

Each part table records 1-byte track mode, which provides track attribute information.

Now, let the eight bits constituting one byte be d1 (MSB) through d8 (LSB), then this track mode is defined as follows:
d1 . . . 0: write protected (deletion by rewriting and editing are prohibited)
1: write permitted
d2 . . . 0: copyrighted, 1: not copyrighted
d3 . . . 0: original, 1: first generation or higher
d4 . . . 0: audio data, 1: others
d5, d6 . . . 0: normal audio, others: not defined
d7 . . . 0: monaural, 1: stereo
d8 . . . 0: emphasis off, 1: emphasis on It should be noted that in the track mode of the part table for an audio track, d4=0 above indicates a track based on MD audio data.

On the other hand, in the track mode of the part table for a data track, d4=1 above indicates that this track is not a track based on MD audio data. In this example, d4=1 provides information that this track is a data track based on high-density data.

FIGS. 8A to 8F show an example of track management by U-TOC.

FIGS. 8A, 8B, and 8C indicate examples in which an audio track and a data track may be recorded at arbitrary positions in the data area as shown in FIG. 2.

In FIG. 8A, tracks TK1 and TK3 managed by U-TOC sector 0 are audio tracks and track TK2 is a data track.

In this case, the part table pointed by pointer P-TNO1 describes the start and end addresses and track mode of audio track TK1.

The part table pointed by pointer P-TNO2 describes the start and end addresses and track mode of data track TK2. This track mode is d4=1.

The part table pointed by pointer P-TNO3 describes the start and end addresses and track mode of audio track TK3.

The part table pointed by pointer P-FRA describes the start and end address of a free area.

FIG. 8B shows an example in which track TK1 managed by U-TOC sector 0 is a data track and this data track is composed of two parts, TK1-1 and TK1-2.

In this example, the part table pointed by pointer P-TNO1 describes the start and end addresses and track mode of the first part TK1-1 of data track TK1 and the part table linked from that part table describes the start and end addresses and track mode of the second part TK1-2 of data track TK1. In the part tables, the track mode is d4=1.

FIG. 8C shows an example in which two tracks TK1 and TK3 managed by U-TOC sector 0 are data tracks.

In this example, the part table pointed by pointer P-TNO1 describes the start and end addresses and track mode of data track TK1.

The part table pointed by pointer P-TNO3 describes the start and end addresses and track mode of data track TK3.

In these part tables, the track mode is d4=1.

FIG. 8D shows an example in which audio recording area AA and high-density data recording area DA are set in a divided manner in the data area as shown in FIG. 3 for example, the data track being recorded on the inner periphery side as track TK1 and audio tracks TK2 and TK3 being recorded on the outer periphery side.

In this example, the part table pointed by pointer P-TNO1 describes the start and end addresses and track mode of data track TK1.

FIGS. 8E and 8F are examples in which the entire data area provides the high-density data recording area DA as shown in FIG. 4 for example.

FIG. 8E shows an example in which one data track TK1 which extends the entire data area is recorded. In this example, the part table pointed by P-TNO1 describes the start and end addresses and track mode of data track TK1.

FIG. 8F shows an example in which two data tracks TK1 and TK2 are recorded in the data area. In this example, the part table pointed by pointer P-TNO1 describes the start and end addresses and track mode of data track TK1 and the part table pointed by pointer P-TNO2 describes the start and end addresses and track mode of data track TK2.

As shown in the above-mentioned examples, on the basis of U-TOC, audio tracks are managed on a track basis and data tracks are also managed on a track basis.

The actual management in each data track is executed by constructing a FAT file system for example as described above.

4. Cluster Structure

The following describes a cluster structure employed for the disk of the present embodiment.

In audio Mini Disc systems, a cluster/sector structure corresponding to physical addresses as ADIP is employed. In the disk according to the present embodiment, this cluster/sector structure is used without change with respect to the recording/reproducing of audio tracks.

First, a cluster/sector structure corresponding to this ADIP will be described with reference to FIGS. 9A and 9B.

It should be noted that, for the convenience of description, the cluster/sector corresponding to ADIP is referred to as "ADIP cluster" and "ADIP sector". A different cluster/sector structure is used for the recording/reproducing of data tracks, which is referred to as "high-density data cluster" and "high-density data sector".

For MD audio data, data streams on an ADIP cluster basis are formed as recording data. On each recording track in a Mini Disc system, clusters CL (CL#(n), CL#(n+1) . . . ) are continuously formed as shown in FIG. 9B, in which one ADIP cluster is the minimum unit at the recording of MD audio data.

One ADIP cluster CL is composed of four link sectors indicated by ADIP sectors SCFC through SCFF and 32 main sectors indicated by ADIP sectors SC00 through SC1F as shown in FIG. 9A. Namely, one ADIP cluster is composed of 36 ADIP sectors.

One ADIP sector provides a data unit formed by 2352 bytes.

The link sectors SCFC through SCFF may be used for a buffer area between recording operations, to adjust various operations, or to record information set as sub data.

The above-mentioned P-TOC data, U-TOC data, and MD audio data are recorded in the main sectors SC00 through SC1F of 32 sectors.

The link sector and the main sector are physically the same.

Assume here that a data track is recorded to the disk having the above-mentioned physical cluster/sector structure, namely high-density data with the linear density of data recording enhanced by the above-mentioned second modulating over MD audio data are recorded.

When high-density data having a high linear density are recorded the address obtained from the ADIP originally recorded on the disk does not match address of a signal to be actually recorded. In random access, accessing is performed with reference to ADIP address. In data reading, recorded data may be read by accessing an approximate position on the basis of ADIP address, causing little problem. However, in data writing, unless writing is performed by accessing correct positions, the recorded data may be erased by overwriting. In playback, it is also obviously preferable to access correct positions for quick data reading.

Consequently, it is proper that the high-density data cluster/high-density data sector with respect to high-density data recording/reproducing should be correctly grasped from ADIP address.

For this purpose, it is configured that high-density data clusters may be grasped with the ADIP address molded on the disk used as the data unit to be obtained by converting the ADIP address in accordance with predetermined rules.

In this case, an integral multiple of the ADIP sector providing the ADIP address unit becomes a high-density data cluster.

Consequently, at recording of high-density data to a given position, the writing may be started always with the same timing after obtaining the ADIP address from the disk.

In addition, it is configured that the integral number of high-density data clusters are included in the ADIP cluster, which is the ADIP address unit. Then, the rules of conversion from the ADIP cluster address to the high-density data cluster address may be simplified, which in turn simplifies the circuit or software configuration for the conversion.

FIGS. 9C and 9D show examples in which two high-density data clusters are written to one ADIP cluster on the basis of the above-mentioned concept.

As shown in FIG. 9C, each of data clusters dCL (dCL#(2n), dCL#(2n+1) . . . ) is formed in ½ of an ADIP cluster.

Namely, two high-density data cluster sections=one ADIP cluster section. Therefore, 18 ADIP sector sections=one high density data cluster section.

Therefore, in a particular section (part), the offsets of two high-density data clusters to be recorded to ADIP cluster CL#(n) with the number of ADIP clusters (=ADIP cluster offset) from its head being #n are #2n and #2n+1, respectively.

To be more specific, high-density data clusters dCL#(2n) and dCL#(2n+1) are recorded to ADIP cluster CL#(n) as shown in FIGS. 9B and 9C.

High-density data cluster dCL#(2n) becomes the sections of ADIP sectors SCFC through SC0D in ADIP cluster CL#(n) and high-density data cluster dCL#(2n+1) becomes the sections of ADIP sectors SC0E through SC1F in ADIP cluster CL#(n).

These high-density data clusters each provide the minimum rewriting unit for high-density data.

Each high-density data cluster has a structure which includes 16 high-density data sectors. Namely, as shown in FIG. 9D, in the section of one high-density data cluster, a preamble is formed in the front end and a postamble is formed in the last end, the section between the preamble and the postamble being arranged with 16 high-density data sectors dSC#0 through dSC#15.

One high-density data sector is 4096 bytes long for example. This high-density data sector is not directly correlated with ADIP address.

It should be noted that FIGS. 9A to 9D shows an example in which two high-density data clusters are arranged in one ADIP cluster. It is also possible that three or more high-density data clusters are arranged in one ADIP cluster. Obviously, one high-density data cluster is not limited to the sections of 18 ADIP sectors.

The arrangements of data clusters may be determined depending upon the difference between the first modulating scheme and the second modulating scheme, the number of sectors which forms a high-density data cluster, the size of one sector, and other design conditions.

5. FAT File System Implementation Example in Data Track

The following describes an exemplary structure of a data track in which various data are recorded as high-density data with reference to FIGS. 10A to 10E. As described with reference to FIG. 5, each data track is formed with an area freed for an external computer equipment for example as an exportable area and an area not disclosed to the outside, in which unique ID and hash value are recorded. A high-density data cluster forming a data track is managed by a cluster attribute table (CAT).

FIGS. 10A to 10E show an example in which a FAT file system is realized in the exportable area.

Figures 10A, 10B, 10C, 10D, 10E:
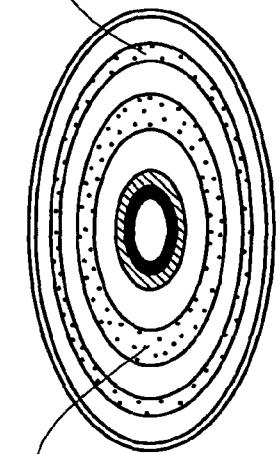
FIGS. 10A to 10E illustrate a FAT file system in the data tracks on the above-mentioned disk.

In this example, as shown in FIGS. 10D and 10E, it is assumed that one data track is recorded as two parts as managed by U-TOC on the disk. The first part of the data track is the section covering ADIP cluster #0 through #2 and the second part is the section covering ADIP cluster #3. In this case, these two parts are positioned in a physically separated manner as schematically shown in FIG. 10E.

This data track is formed in four ADIP clusters. In the case of the cluster structure described with reference to FIGS. 9A to 9D, the data track is configured by eight high-density data clusters #0 through #7 shown in FIG. 10C.

These high-density data clusters #0 through #7 are managed by CAT, in which a particular high-density data cluster provides an exportable area shown in FIG. 5 and another high-density data cluster provides an area not seen from the outside (a hidden (secure) data area).

In this example, high-density data cluster #0 is a hidden data area, in which disk ID which is unique ID and hash value are recorded.

Also, in this example, high-density data clusters #1 through #7 provide an exportable area.

This exportable area is freely accessible from external computer equipment for example via an interface such as USB or SCSI.

The unit in which a read/write operation is performed in the exportable area is generally 512 bytes, 1024 bytes, or 2048 bytes for example, which is smaller than the high-density data cluster, which is data track rewriting unit.

The use of the exportable area depends on the OS of a connected computer for example. In this example, it is assumed that a FAT file system is recorded in the exportable area.

To be more specific, as shown in FIG. 10B, FAT clusters #0 through #55 of 8192 bytes long are formed. One FAT cluster is formed by four FAT sectors #0 through #3 each 2048 bytes long.

The FAT sector and the FAT cluster referred to herein denotes the unit in which the FAT file system handles data and is independent of the above-mentioned ADIP cluster or high-density data cluster and the above-mentioned ADIP sector or high-density data sector.

For example, these FAT clusters #0 through #55 store a FAT file system configured by FAT and data files managed by FAT.

It should be noted that the handling of data in the FAT file system is performed on a FAT sector basis on the computer. However, a rewriting operation on the disk is performed on a high-density data cluster basis, so that in the case of the rewriting of one particular FAT sector, the rewriting on the disk is performed in a unit of the high-density data cluster in which this FAT sector is included.

For example, an example in which the read/write operation of the FAT sector data for the FAT file system recorded as the data track on the disk will be described later.

The unique ID and hash value recorded in high-density data cluster #0, which is a hidden data area, are used for the authentication and tamper checking of the data in the FAT file system. The read/write operation on the hidden data area is allowed only for particular devices, in which this read/write operation is performed by encrypting data through a cross-authentication procedure to be specified separately hereof.

It should be noted that, in the example shown in FIGS. 10A to 10E, high-density data cluster #0 which is the first cluster is the hidden data area; it will be apparent that any other high-density data cluster may become the hidden data area.

6. Configuration of Disk Drive Apparatus

Figure 11:
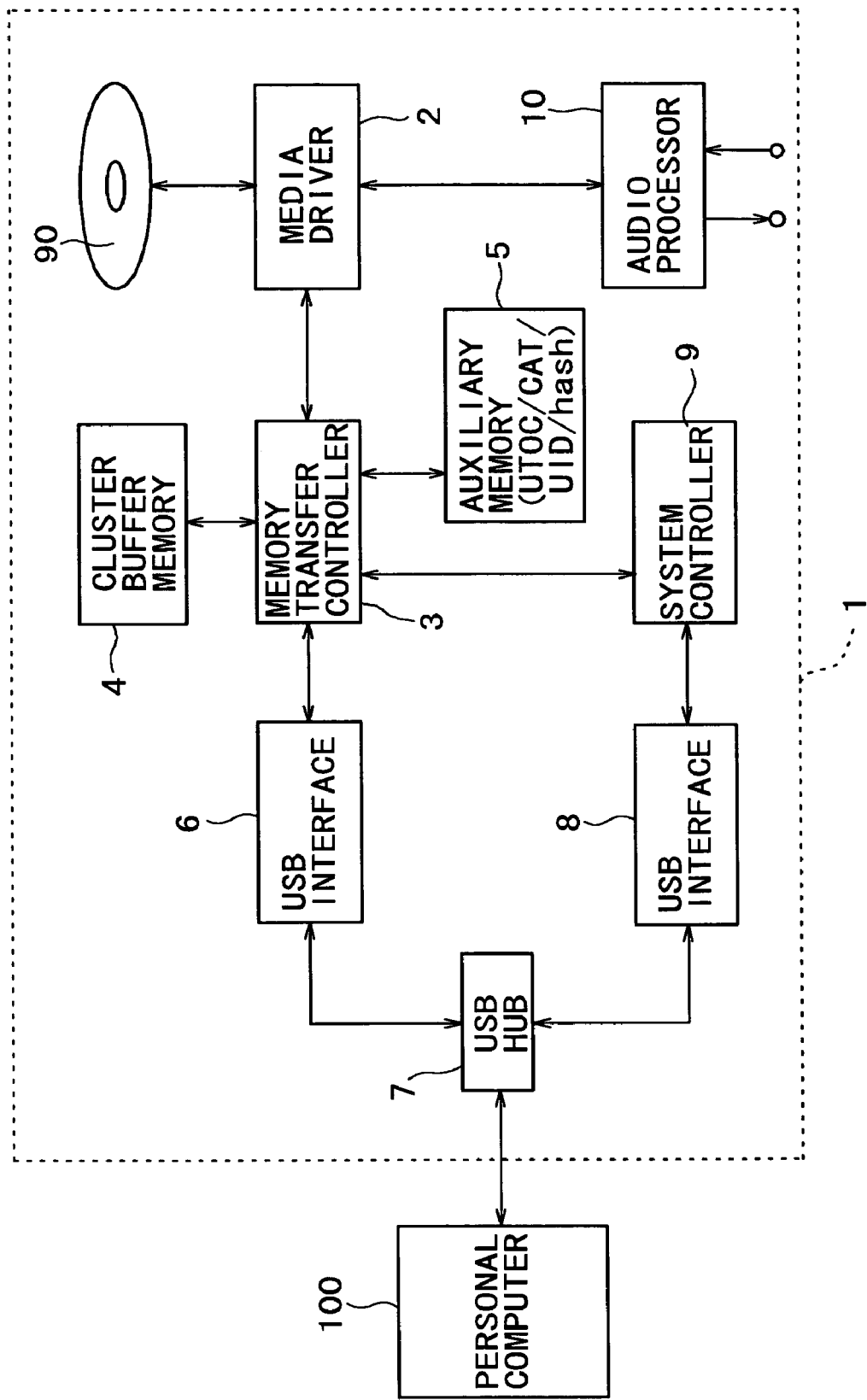
FIG. 11 is a block diagram illustrating a disk drive apparatus practiced as the embodiment of the present invention.
Figure 12:
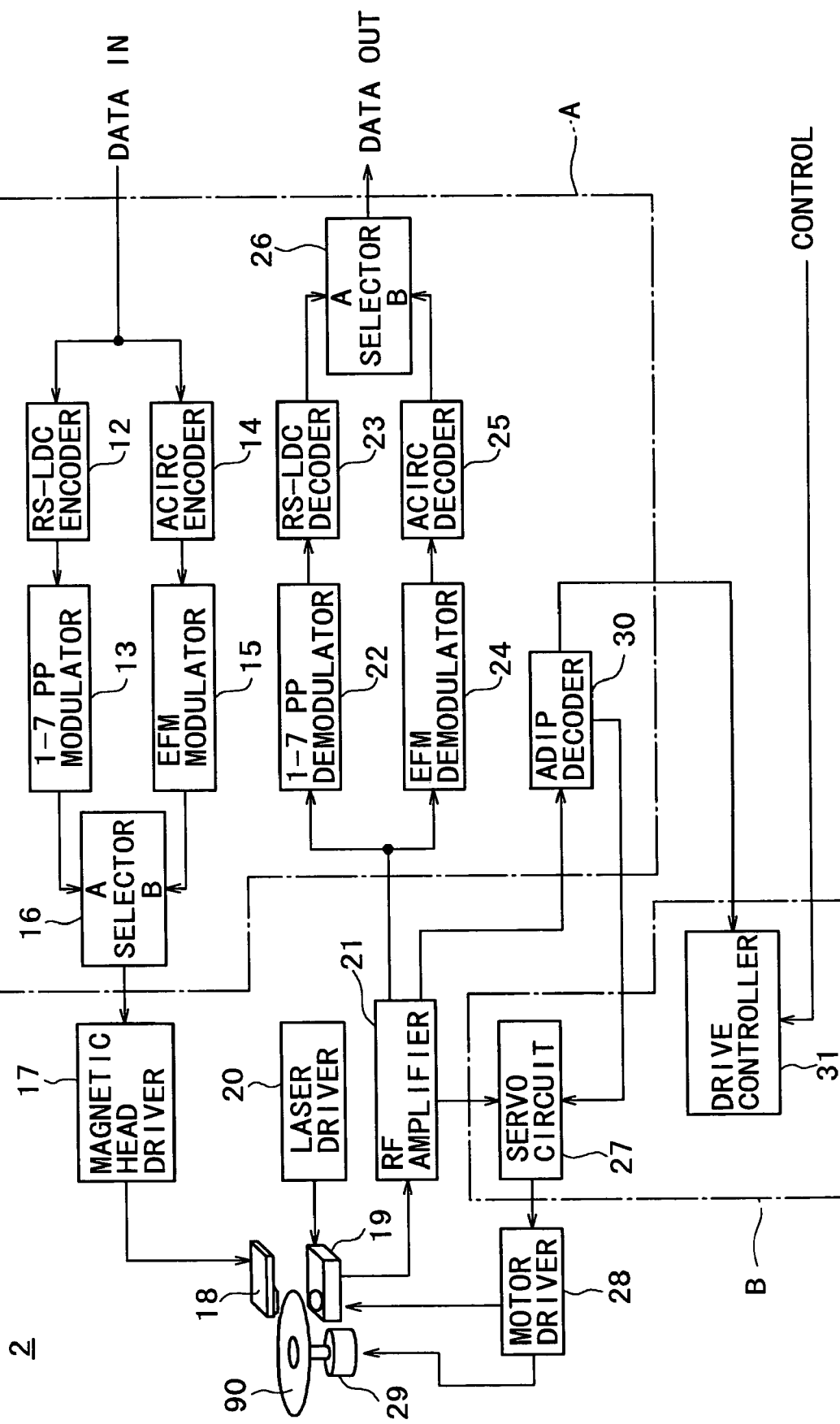
FIG. 12 is a block diagram illustrating a media driver of the above-mentioned disk drive apparatus.

The following describes a configuration of a disk drive apparatus (a recording/reproducing apparatus) compliant with the disk according to the present embodiment with reference to FIGS. 11 and 12.

FIG. 11 shows a disk drive apparatus 1 according to the present embodiment, which is connectable to a personal computer 100 for example.

The disk drive apparatus 1 has a media driver 2, a memory transfer controller 3, a cluster buffer memory 4, an auxiliary memory 5, a USB interfaces 6, 8, a USB hub 7, a system controller 9, and an audio processor 10.

The media driver 2 performs a recording/reproducing operation on a loaded disk 90 according to the present embodiment. An internal configuration of the media driver 2 will be described with reference to FIG. 12.

The memory transfer controller 3 controls the transfer of reproduced data from the media driver 2 and the recording data to be supplied to the media driver 2.

The cluster buffer memory 4 buffers the data read from the data track of the disk 90 on a high-density data cluster unit by the media driver 2 under the control of the memory transfer controller 3.

The auxiliary memory 5 stores various management information and special information read from the disk 90 by the media driver 2 under the control of the memory transfer controller 3. This information includes U-TOC data, CAT data, unique ID, and hash value for example.

The system controller 9 controls the entire disk drive apparatus 1, and at the same time, the communication with the connected personal computer 100.

Namely, the system controller 9 is communicable with the personal computer 100 connected via the USB interface 8 and the USB hub 7, thereby receiving commands such as request to write and request to read and sending status information and other necessary information.

The system controller 9, in response to the loading of the disk 90 into the media driver 2 for example, instructs the media driver 2 to read the management information for example from the disk 90 and store the management information for example read by the memory transfer controller 3 into the auxiliary memory 5.

By reading P-TOC and U-TOC management information, the system controller 9 can grasp the track recording status on the disk 90.

By reading CAT information, the system controller 9 can grasp the high-density data cluster structure in the data track, thereby becoming ready for a request to access the data track from the personal computer 100.

By means of unique ID and hash value, the system controller 9 can process disk authentication and other processing or send these values to the personal computer 100 to have the value processed.

If a request to read a particular FAT sector comes from the personal computer 100, the system controller 9 causes the media driver 2 to read the high-density data cluster which includes the requested FAT sector. The retrieved high-density data cluster is written by the memory transfer controller 3 into the cluster buffer memory 4. It should be noted that, if the data of that FAT sector are already in the cluster buffer memory 4, the media driver 2 need not perform the read operation.

Then, the system controller 9 performs control that the data of the requested FAT sector are read from the data of the high-density data cluster stored in the cluster buffer memory 4 and the retrieved data are sent to the personal computer 100 via the USB interface 6 and the USB hub 7.

If a request to write to a particular FAT sector comes from the personal computer 100, the system controller 9 causes the media driver 2 to read the high-density data cluster which includes the requested FAT sector. The retrieved high-density data cluster is written to the cluster buffer memory 4 by the memory transfer controller 3. It should be noted that, if the data of that FAT sector are already in the cluster buffer memory 4, the media driver 2 need not perform the read operation.

Then, the system controller 9 supplies the data (recording data) of the FAT sector from the personal computer 100 to the memory transfer controller 3 via the USB interface 6 to cause it to rewrite the data of the FAT sector in the cluster buffer memory 4.

Next, the system controller 9 instructs the memory transfer controller 3 to transfer the data of the high-density data cluster stored in the cluster buffer memory 4 as rewritten in necessary FAT sectors to the media driver 2 as the recording data. The media driver 2 modulates the received recording data of the high-density data cluster concerned by the second modulating scheme and writes the modulated data to the disk 90.

It should be noted that the above-mentioned control operations are for data track recording/reproducing; the data transfer for the recording/reproducing of MD audio data (audio tracks) is performed via the audio processor 10.

The audio processor 10 has, as its input system, an analog audio signal input section such as a line input circuit/microphone input circuit, an A/D converter, and a digital audio data input section.

The audio processor 10 also has an ATRAC compression encoder/decoder and a buffer memory for buffering compressed data.

In addition, the audio processor 10 has, as its output system, a digital audio data output section and an analog audio signal output section such as a D/A converter, a line output circuit/headphone output circuit.

An audio track is recorded to the disk 90 when digital audio data (or an analog audio signal) is inputted to the audio processor 10. The inputted linear PCM digital audio data or the linear PCM audio data obtained by converting an analog audio signal by the A/D converter are encoded for ATRAC compression to be stored in the buffer memory. Then, in a predetermined timing relation (in a data unit equivalent to ADIP cluster), the stored data are read from the buffer memory to be transferred to the media driver 2.

The media driver 2 modulates the received compressed data by the first modulating scheme to write the modulated data to the disk 90 as an audio track.

When the audio track is reproduced from the disk 90, the media driver 2 demodulates the reproduced data into the ATRAC compressed data and transfers the demodulated data to the audio processor 10. The audio processor 10 ATRAC-compression-decodes the received data into linear PCM audio data and outputs the audio data from the digital audio data output section. Alternatively, the audio processor 10 Converts the data by the D/A converter into an analog audio signal and line-outputs/headphone-outputs this analog audio signal.

It should be noted that the configuration shown in FIG. 11 is illustrative only. For example, if the disk drive apparatus 1 is connected to the personal computer 100 to function as a device only for the recording/reproducing data tracks, the audio processor 10 need not be arranged.

On the other hand, to perform recording/reproducing of music for example by the user by means of the audio processor 10, it is preferable to arrange an operator section and a display section as user interface.

Further, the connection with the personal computer 100 may be made via an external interface such as IEEE 1394 for example, rather than USB.

The following describes a configuration of the media driver 2 as having capabilities of recording/reproducing both data tracks and audio tracks with reference to FIG. 12.

In the media driver 2, the loaded disk 90 is rotatively driven by a spindle motor 29 in a CLV manner.

A laser beam is radiated to the disk 90 from an optical head 19 at recording or reproducing.

At recording the optical head 19 performs high-level laser output in order to increase the recording track to the Curie temperature, at reproducing, the optical head 19 performs a relatively low level laser output in order to detect data form the reflected beam by the magnetic Kerr effect. For this purpose, the optical head 19 is equipped with an optical system composed of a laser diode as a laser output means, a polarized beam splitter, and an objective lens as well as a detector for detecting a reflected beam, although a detailed illustration thereof is omitted. The objective lens arranged on the optical head 19 is displaceably held in the direction of disk radius and disk axis by means of a biaxial mechanism.

A magnetic head 18 is arranged at the opposite side of the optical head 19 with the disk 90 in between. The magnetic head 18 applies the magnetic field modulated by the recording data to the disk 90.

Although not shown, a sled motor and a sled mechanism are arranged for moving the entire optical head 19 and the magnetic head 18 in the direction of disk radius.

In addition to the recording/reproducing head system based on the optical head 19 and magnetic head 18 and the disk rotary drive system based on the spindle motor 29, the media driver 2 has a recording processing system, reproducing processing system, and a servo system.

The recording processing system is composed of a block for performing the modulation by the first modulating scheme (EFM modulation and ACIRC encoding) at recording of audio tracks and a block for performing the modulation by the second modulating scheme (RLL(1-7) PP modulation and RS-LDC encoding) at recording of data tracks.

The reproducing processing system is composed of a block for performing demodulation corresponding to the first modulating scheme (EFM demodulation and ACIRC decoding) at reproducing of audio tracks and a block for performing demodulation corresponding to the second modulating scheme (RLL(1-7) demodulation based on partial response PR(1, 2, 1) and the data detection based on Viterbi decoding, RS-LDC decoding) at reproducing data tracks.

The information (a photoelectric current detected by a laser reflected beam by a photo detector) obtained by detecting a laser radiation to the disk 90 from the optical head 19 is supplied to an RF amplifier 21.

The RF amplifier 21 performs current-voltage conversion, amplification, and matrix computation on the inputted detected information to extract a reproduction RF signal, a tracking error signal TE, a focus error signal FE, groove information (the ADIP information recorded on the disk 90 by track wobbling) as reproduction information.

At reproducing of an audio track, the reproduced RF signal obtained in the RF amplifier is processed in an EFM demodulator 24 and an ACIRC decoder 25.

To be more specific, a reproduced RF signal is digitized in the EFM demodulator 24 into an EFM signal sequence, which is EFM-demodulated and then error-corrected and deinterleaved in the ACIRC decoder 25. Namely, at this point of time, the RF signal becomes ATRAC-compressed data.

Then, at reproducing the audio track, a selector 26 is selected to contact B and the demodulated ATRAC-compressed data are outputted from the disk 90 as reproduced data. In this case, the compressed data are supplied to the audio processor 10 shown in FIG. 11.

On the other hand, at reproducing of a data track, the reproduced RF signal obtained by the RF amplifier is processed in the RLL(1-7) PP demodulator 22 and the RS-LDC decoder 23.

To be more specific, for the reproduced RF signal, reproduced data as a RLL(1-7) code sequence are obtained by the data detection based on PR(1, 2, 1) and Viterbi decoding, and RLL(1-7) demodulation processing is performed on this RLL (1-7) code sequence at RLL(1-7) PP demodulator 22. Further, error correction and deinterleave processing is performed on the demodulated data in the RS-LDC decoder 23.

Then, at reproducing of the data track, the selector 26 is selected to contact A, and the demodulated data are outputted from the disk 90 as reproduced data. In this case, the demodulated data are supplied to the memory transfer controller 3 in FIG. 11.

The tracking error signal TE and the focus error signal FE outputted from the RF amplifier 21 are supplied to a servo circuit 27 and the groove information is supplied to an ADIP decoder 30.

The ADIP decoder 30 performs band limit on the groove information through a bandpass filter to extract the wobble component and then performs FM demodulation and biphase demodulation to extract the ADIP address.

The extracted ADIP address, which is the absolute address information on the disk, is supplied to a drive controller 31. The drive controller 31 performs predetermined control processing on the basis of the supplied ADIP address.

The groove information is also supplied to the servo circuit 27 for spindle servo control.

On the basis of an error signal obtained by integrating groove information by a phase error with a reproduction clock (a PLL clock at decoding) for example, the servo circuit 27 generates a spindle error signal for CLV servo control.

Also, on the basis of a spindle error signal, a tracking error signal supplied from the RF amplifier 21 as described above, a focus error signal, or a track jump command and an access command supplied from the drive controller 31, the servo circuit 27 generates various servo control signals (tracking control signal, focus control signal, sled control signal, and spindle control signal) and output them to a motor driver 28. Namely, the servo circuit 27 performs necessary processing such as phase compensation processing, gain processing, and target value setting processing on the above-mentioned servo error signal and commands to generate the above-mentioned various servo control signals.

On the basis of the servo control signals supplied from the servo circuit 27, the motor driver 28 generates predetermined servo drive signals. These servo drive signals include a biaxial drive signals (two signals in the directions of focusing and tracking) for driving the biaxial mechanism, a sled motor drive signal for driving the sled mechanism, and a spindle motor signal for driving the spindle motor 29.

On the basis of these servo drive signals, focus control and tracking control are performed on the disk 90 and CLV control is performed on the spindle motor 29.

When a recording operation is performed on the disk 90, the high-density data from the memory transfer controller 3 or the ATRAC compressed data from the audio processor 10 are supplied.

When an audio track is recorded, the selector 16 is selected to contact B, so that an ACIRC encoder 14 and an EFM modulator 15 function.

In this case, the compressed data from the audio processor 10 are interleaved and error-correction coded in the ACIRC encoder 14 and then the resultant data are EFM-modulated in the EFM modulator 15.

Then, the EFM-modulated data are supplied to a magnetic head driver 17 via the selector 16 and the magnetic head 18 performs magnetic field application on the disk 90 on the basis of the EFM-modulated data, thereby recording the audio track.

When a data track is recorded, the selector 16 is selected to contact A, so that an RS-LDC encoder 12 and an RLL(1-7) PP modulator 13 function.

In this case, the high-density data from the memory transfer controller 3 are interleaved and error-correction coded based RS-LDC in the RS-LDC encoder 12 and the resultant data are RLL(1-7)-modulated in the RLL(1-7) PP modulator 13.

Then, the recording data as an RLL(1-7) code sequence are supplied to the magnetic head driver 17 via the selector 16 and the magnetic head 18 performs magnetic field application on the disk 90 on the basis of the modulated data, thereby recording the data track.

A laser driver/APC 20 causes the laser diode to perform a laser radiating operation at the time of reproducing and recording described above, and at the same time, performs a so-called APC (Automatic Laser Power Control) operation.

To be more specific, although not shown, a detector for laser power monitoring is arranged in the optical head 19 and a monitor signal generated thereby is fed back to the laser driver/APC 20. The laser driver/APC 20 compares the current laser power obtained as a monitor signal with the preset laser power and reflects the difference therebetween onto a laser drive signal, thereby controlling the laser power to be outputted from the laser diode to be stable at the preset value.

It should be noted that, for the laser power, the values as the reproducing laser power and the recording laser power are set to the register in the laser driver/APC 20 by the drive controller 31.

The drive controller 31 performs control on the basis of the instruction from the system controller 9 such that each of the above-mentioned operations (access, various servo operations, data writing, and data reading) is executed.

It should be noted that block A and block B enclosed by dot-and-dash lines shown in FIG. 12 may be configured by a one-chip circuit for example.

Meanwhile, if the area setting of the disk 90 is made beforehand such that the data track recording area DA and the audio track recording area AA are separately arranged as shown in FIG. 3, the system controller 9 instructs the drive controller 31 of the media driver 2 to make access on the basis of the area setting concerned depending on whether the data to be recorded/reproduced are an audio track or a data track.

If, for the disk 90, a dedicated disk with its entire area providing the data track recording area DA is loaded as shown in FIG. 4, the system controller 9 performs control such that the recording of an audio track is prohibited on that disk. Namely, the system controller 9 performs control such that the audio processor 10 will not function.

7. Data Track Sector Read Processing

The following describes the read processing and the write processing on a data track as instructed by the connected personal computer 100 for example.

For access to an area which is the exportable area in a data track, the external personal computer 100 transmits a recording or reproducing command on a "logical sector (=FAT sector) basis" to the system controller 9 of the disk drive apparatus 1 via the USB interface 8.

Each of the logical sectors as FAT sectors shown in the example of FIGS. 10A to 10E is 2048 bytes long, the numbers starting with 0 being sequentially continuously assigned to these sectors in an ascending manner.

On the other hand, the minimum rewrite unit with respect to a data track on the disk 90 is a high-density data cluster. Each high-density data cluster is 65536 bytes long, the numbers starting with 0 being sequentially continuously assigned to these clusters in an ascending manner.

It should be noted that, as described with reference to FIGS. 10A to 10E, some clusters (a hidden data area) are not used for the data area, which may be distinguished from the other clusters by CAT (Cluster Attribute Table).

The size of a logical sector is smaller than that of a high-density data cluster. Therefore, in the disk drive apparatus 1, it is necessary to convert each logical sector into a physical ADIP address and convert the reading/writing on a logical sector basis into the reading/writing on a high-density data cluster basis by use of the cluster buffer memory 4.

Figure 13:
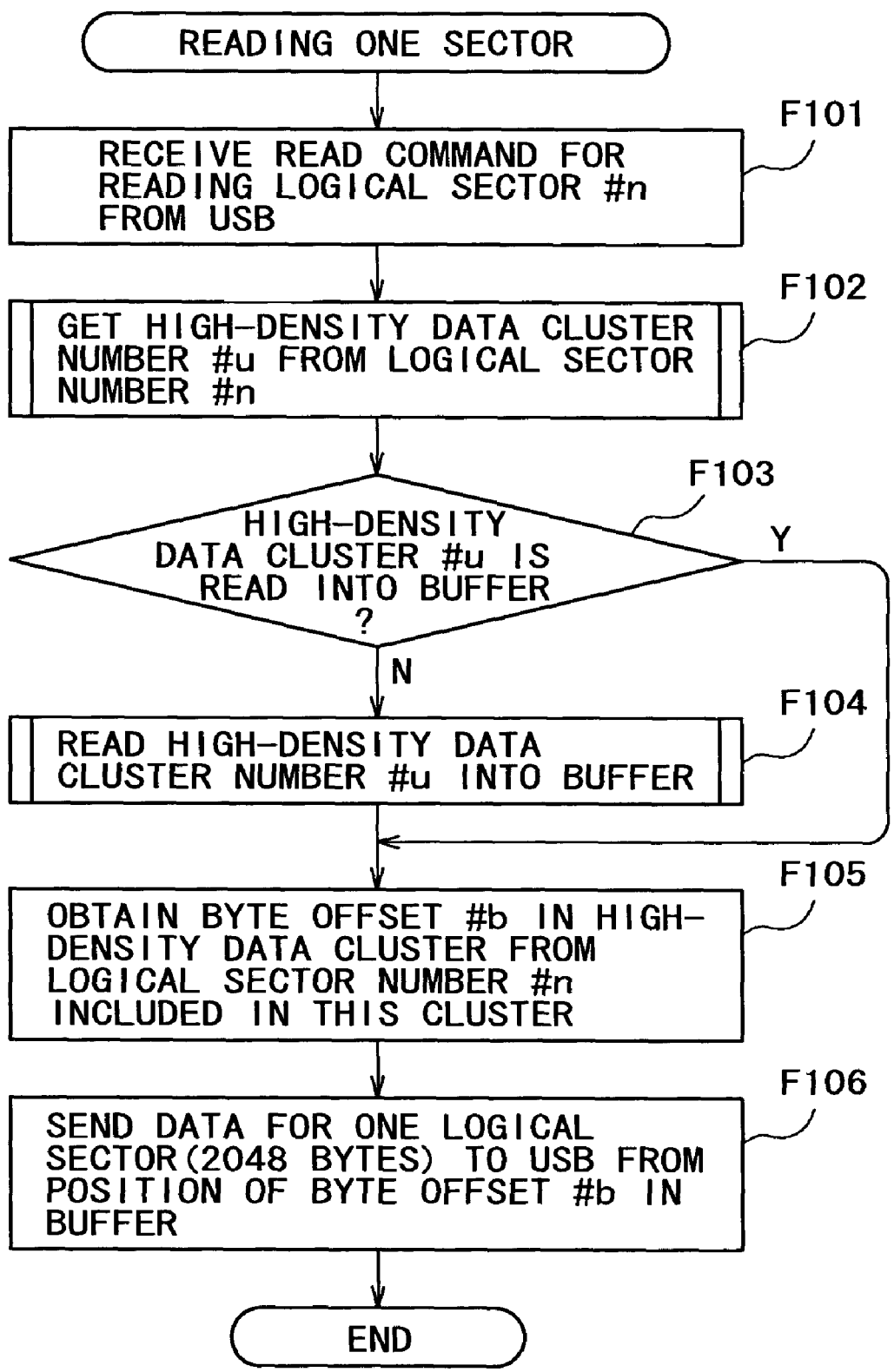
FIG. 13 is a flowchart describing a sector read processing practiced as the embodiment of the present invention.

FIG. 13 shows an example of processing to be executed by the disk drive apparatus 1 (the system controller 9) when a request comes from the personal computer 100 to read a particular logical sector (a FAT sector).

When the system controller 9 receives a read command from the personal computer 100 via the USB interface 8 for reading logical sector #n in step F101, the procedure goes to step F102 to execute a process of obtaining a high-density data cluster number which includes the logical sector having the specified logical sector number #n.

Figure 14:
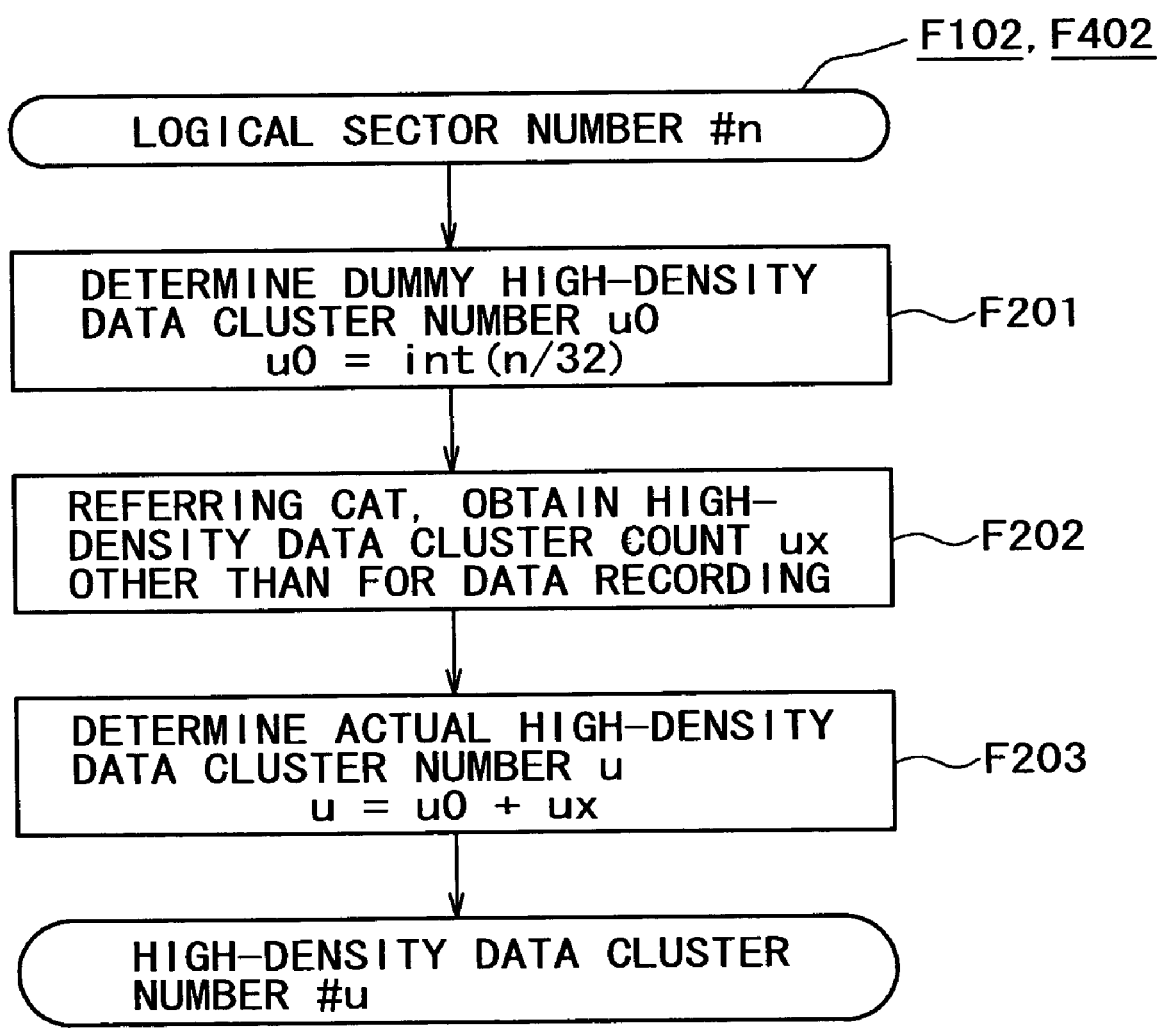
FIG. 14 is a flowchart describing the processing of determining a high-density data cluster number from logical sector numbers practiced as the embodiment of the present invention.

The process of step F102 is shown in FIG. 14.

First, in step F201, a dummy high-density data cluster number u0 is determined. The size of each high-density data cluster is 65536 bytes and the size of each logical sector is 2048 bytes, so that one high-density data cluster contains 32 logical sectors. Therefore, a value (u0) obtained by integrally dividing logical sector number (n) by 32 (the remainder being discarded) provides a dummy high-density data cluster number.

Next, in step F202, with reference to CAT stored from the disk 90 into auxiliary memory 5, the number of high-density data clusters ux other than for data recording (=other than the exportable area); namely, the number of high-density clusters providing a hidden data area is obtained.

As described above, some of the high-density data clusters in a data track are not made public as an area actually enabled for data recording/reproducing. Hence, on the basis of the information of CAT read in the auxiliary memory 5 beforehand, the number of nondisclosed clusters ux is obtained.

In step F203, the obtained number of non-disclosed clusters ux is added to the high-density data cluster number u0 obtained in step F201, the result of this addition being used for actual high-density data cluster number #u.

When the process of FIG. 14 has been executed as step F102 of FIG. 13 to obtain high-density data cluster number #u including logical sector number #n, then the system controller 9 determines in step F103 whether the high-density data cluster having cluster number #u is stored in the cluster buffer memory 4 from the disk 90.

If this high-density data cluster is found not stored, then the procedure goes to step F104 in which the high-density data cluster having cluster number u is read from the disk 90. Namely, the system controller 9 instructs the media driver 2 to read the high-density data cluster having cluster number #u to store the read high-density data cluster into the cluster buffer memory 4.

Figure 16:
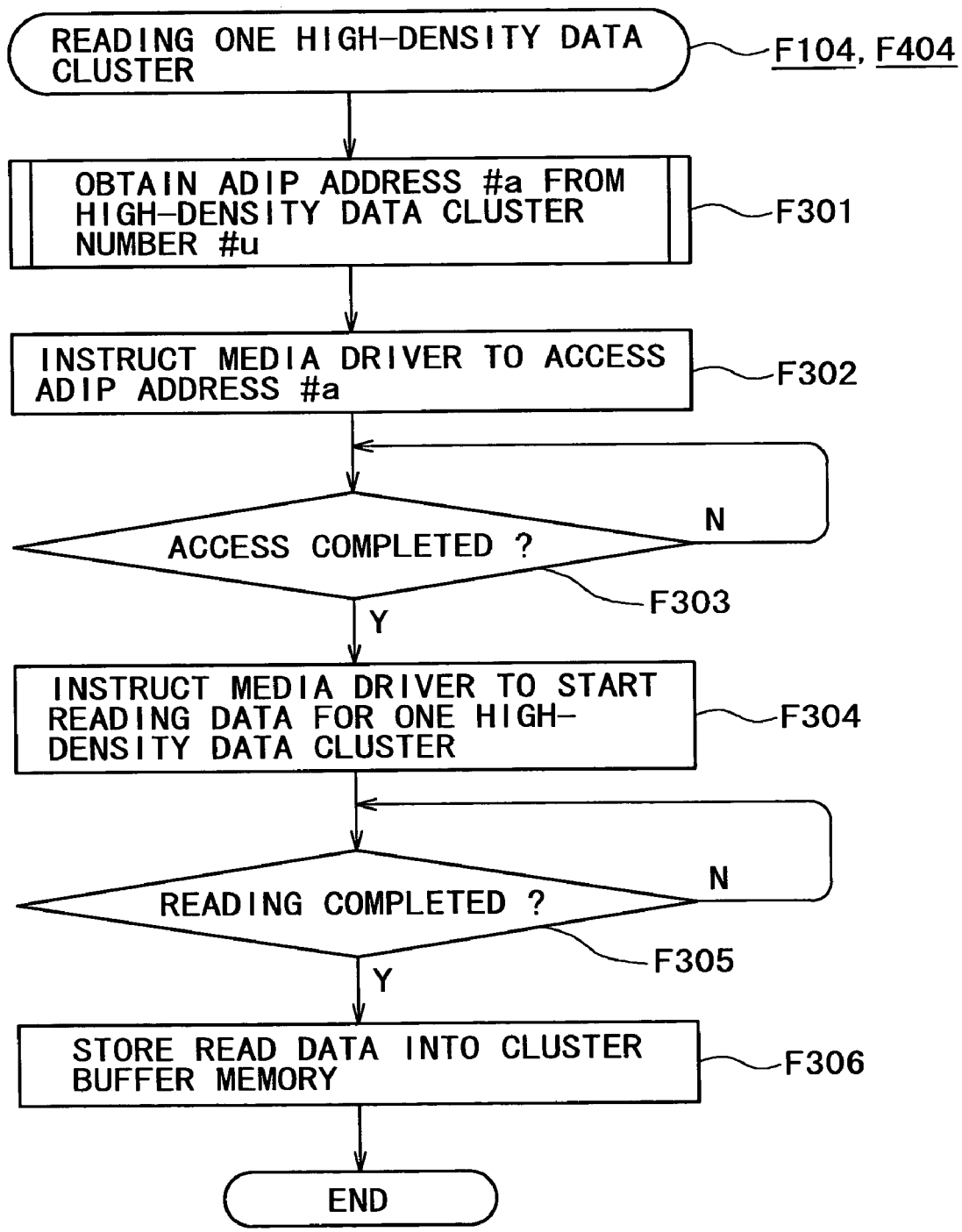
FIG. 16 is a flowchart describing the processing of reading high-density data clusters practiced as the embodiment of the present invention.

The process of step F104, namely the process of reading the high-density data cluster from the disk 90, is shown in FIG. 16.

First, in step F301 shown in FIG. 16, the system controller 9 obtain's ADIP address #a from high-density data cluster number #u to be read. The process of this step F301 is shown in FIG. 15.

A high-density data cluster may be recorded in a plurality of parts on the disk 90. Therefore, to obtain an ADIP address to be actually recorded, these parts must be sequentially searched for.

Figure 15:
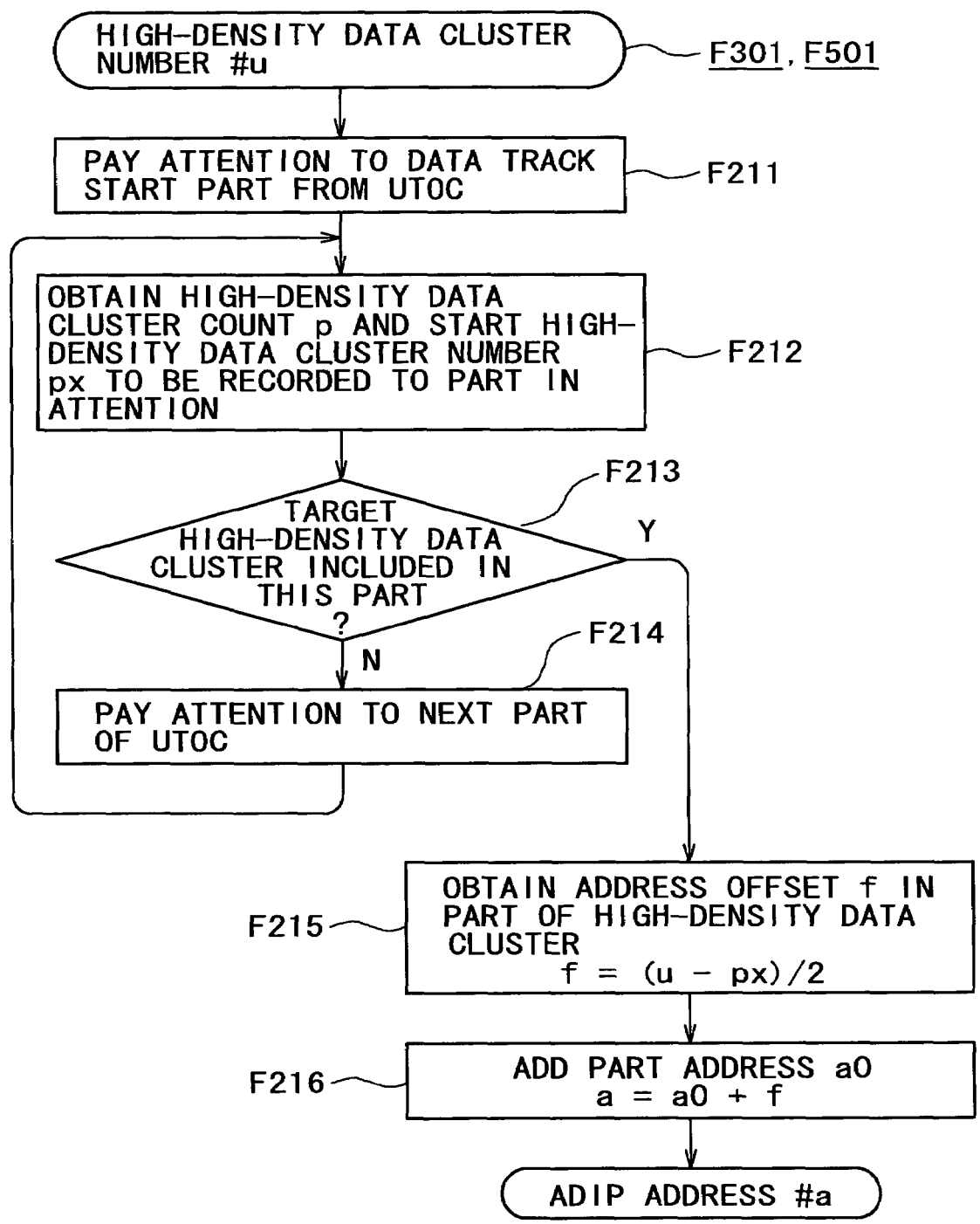
FIG. 15 is a flowchart describing the processing of determining an ADIP address from high-density data cluster numbers practiced as the embodiment of the present invention.

For this purpose, attention is paid to the start part of the data track by referring to the U-TOC stored in the auxiliary memory 5 in step F211 shown in FIG. 15.

Next, in step F212, the number of high-density data clusters p and start high-density data cluster number px recorded to the part in attention are obtained. As described in the description of U-TOC, each part record the start address/end address based on the cluster/sector addresses as ADIP address, so that the number of data clusters p and start high-density data cluster number px may be obtained from ADIP cluster address and part length.

In step F213, it is determined whether the part in attention includes the high-density data cluster having cluster number #u.

If this high-density data cluster is found not included, then attention is paid to a next part in step F214; namely, the part indicated by the link information of the part in U-TOC on which attention has been paid. Then, the procedure returns to step F212.

Namely, in steps F212, F213, and F214, the parts in U-TOC are sequentially searched to detect one that includes the target high-density data cluster.

If the part including the target high-density data cluster (#u) is found, then the procedure goes to step F215 to obtain the difference between high-density data cluster number px recorded at the beginning of that part and target high-density data cluster #u, thereby obtaining an offset from the beginning of that part to the target high-density data cluster (#u).

In this case, because two high-density data clusters are written to one ADIP cluster, dividing this offset by 2 can covert the offset into ADIP address offset f (f=(u−px)/2).

It should be noted that if a fraction of 0.5 occurs, the writing starts from the center of cluster f.

Finally, in step F216, offset f is added to the start ADIP address of this part (namely, the cluster address portion in the start address of the part) to obtain ADIP address #a at which the high-density data cluster is actually written.

When ADIP address #a is obtained in step F301 shown in FIG. 16 by the process shown in FIG. 15, then the system controller 9 instructs the media driver 2 to access ADIP address #a in step F302.

Consequently, the media driver 2 accesses ADIP address #a under the control of the drive controller 31.

In step F303, the system controller 9 waits for the completion of the access. When the access has completed, the system controller 9 instructs the media driver 2 to start reading the data for one high-density data cluster in step F304.

In response, the media driver 2 starts reading the data from the disk 90 under the control of the drive controller 31, outputs the read data via the reproduction system composed of the optical head 19, the RF amplifier 21, the RLL(1-7) PP demodulator 22, and the RS-LDC decoder 23, and supplies the outputted data to the memory transfer controller 3.

In step F305, the system controller 9 waits for the completion of the reading operation by the media driver 2 and stores the read data supplied to the memory transfer controller 3 into the cluster buffer memory 4 in step F306.

When this process shown in FIG. 16 (and FIG. 15) has been executed in step F104 shown in FIG. 13, the data of the necessary high-density data cluster are read into the cluster buffer memory 4.

If the data of high-density data cluster (#u) are found already stored in the cluster buffer memory 4 in step F103, the procedure goes to step F105.

Consequently, at the point of time at which the procedure goes to step F105 shown in FIG. 13, the data of the high-density data cluster containing the logical sector requested by the personal computer 100 are already in the cluster buffer memory 4.

Because the data for one high-density data cluster stored in the cluster buffer memory 4 contain a plurality of logical sectors, the storage location of the data of the requested logical sector are obtained from these logical sectors and the obtained data of 2048 bytes are sent from the USB interface 6 to the external personal computer 100.

To be more specific, the system controller 9 obtains, from requested logical sector number #n, byte offset #b in the high-density data cluster which includes this requested logical sector number in step F105.

In step F106, the system controller 9 reads the data for one logical sector (2048 bytes) from byte offset #b in the cluster buffer memory 4 and transfers the read data to the personal computer 100 via the USB interface 6.

Thus, by the above-mentioned processing, the transfer of logical sector data to the personal computer 100 in response to a request therefrom for reading one logical sector is realized.

8. Data Track Sector Write Processing

Figure 17:
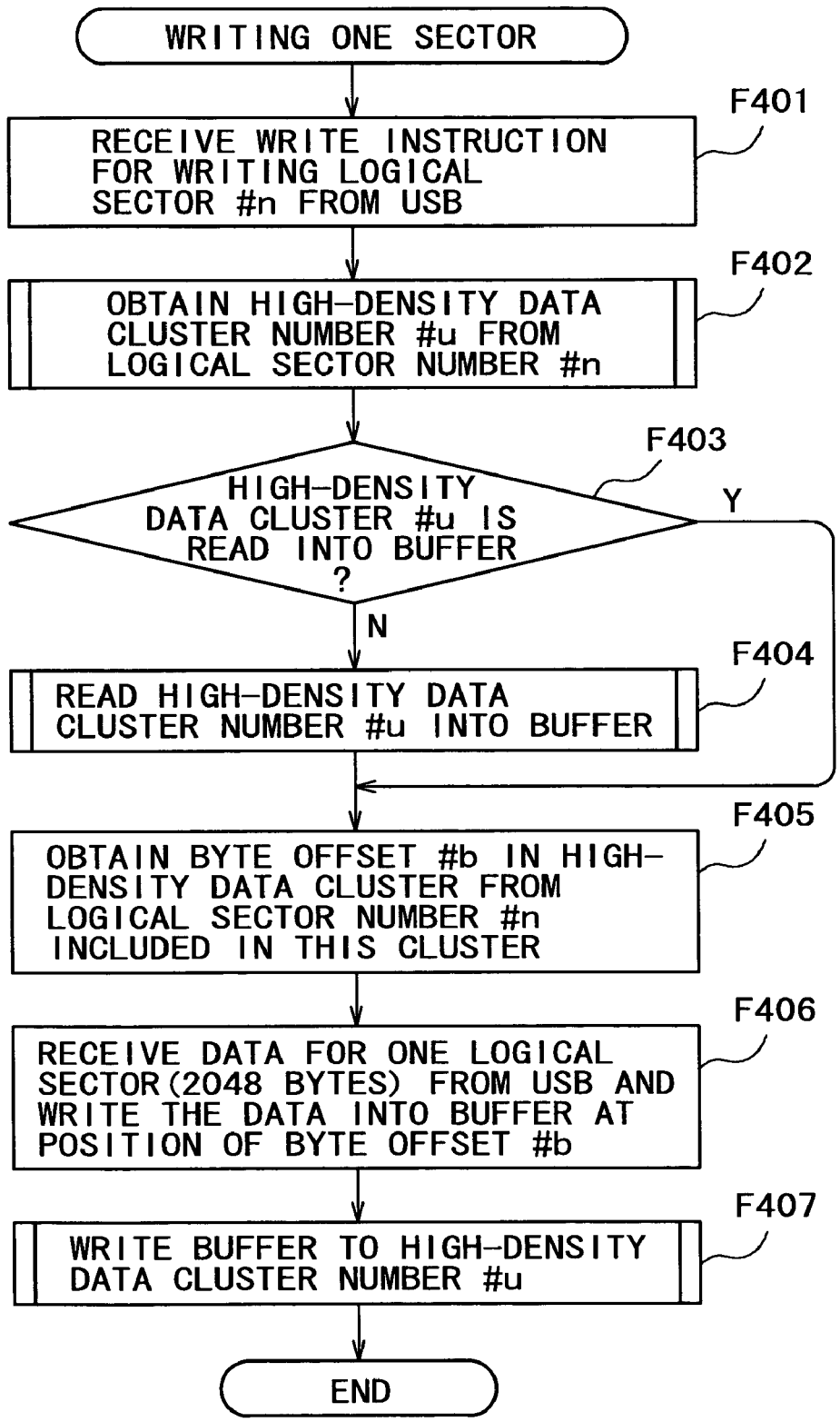
FIG. 17 is a flowchart describing the processing of writing sectors practiced as the embodiment of the present invention.

The following describes the processing by the disk drive apparatus 1 (the system controller 9) to be executed when a request comes from the personal computer 100 for writing a particular logical sector (a FAT sector) with reference to FIG. 17.

When the system controller 9 receives, via the USB interface 8 a write command from the personal computer 100 for writing logical sector #n in step F401 shown in FIG. 17, the procedure goes to step F402 in which a process of obtaining the high-density data cluster number containing the logical sector having the specified logical sector number #n is executed.

This process of step F402 is the above-mentioned process shown in FIG. 14.

When the process described with reference to FIG. 14 has been executed in step F402 to obtain high-density data cluster number #u containing logical sector number #n, then the system controller 9 determines in step F403 whether the high-density data cluster having the requested cluster number #u has been read from the disk 90 and are stored in the cluster buffer memory 4.

If this high-density data cluster is found not stored in the cluster buffer memory 4, then the procedure goes to step F404 in which the high-density data cluster having cluster number u is read from the disk 90. To be more specific, the system controller 9 instructs the media driver 2 to read the high-density data cluster having cluster number #u and store the read high-density data cluster into the cluster buffer memory 4.

The process of step F404, namely the process of reading a high-density data cluster from the disk 90, is executed by the process shown in FIG. 16 (and the process shown in FIG. 15).

The execution of the process shown in FIG. 16 (and the process shown in FIG. 15) in step F404 shown in FIG. 17 has read the data of the necessary high-density data cluster (#u) into the cluster buffer memory 4.

If the data of the high-density data cluster (#u) are found read in the cluster buffer memory 4 in step F403, then the procedure goes to step F405.

Therefore, at the time at which the procedure goes to step F405, the data of the high-density data cluster containing the logical sector requested for writing from the personal computer 100 are already in the cluster buffer memory 4.

Because the data for one high-density data cluster in the cluster buffer memory 4 contains a plurality of logical sectors, the storage location of the data of the logical sector to be written is obtained from these logical sectors.

To be more specific, in step F405, the system controller 9 obtains, from the logical sector number #n associated with the write request, byte offset #b in the high-density data cluster which contains that logical sector number.

In step F406, the system controller 9 receives the data of 2048 bytes from the personal computer 100 via the USB interface 6 which become the data to be written to that logical sector (#n) and writes the data for one logical sector (2048 bytes) starting from the position of byte offset #b in the cluster buffer memory 4.

Consequently, the data of that high-density data cluster (#u) stored in the cluster buffer memory 4 gets in the state in which only the logical sector (#n) specified by the personal computer 100 has been rewritten.

Therefore, the system controller 9 executes, in step F407, a process of writing the high-density data cluster (#u) stored in the cluster buffer memory 4 to the disk 90.

Figure 18:
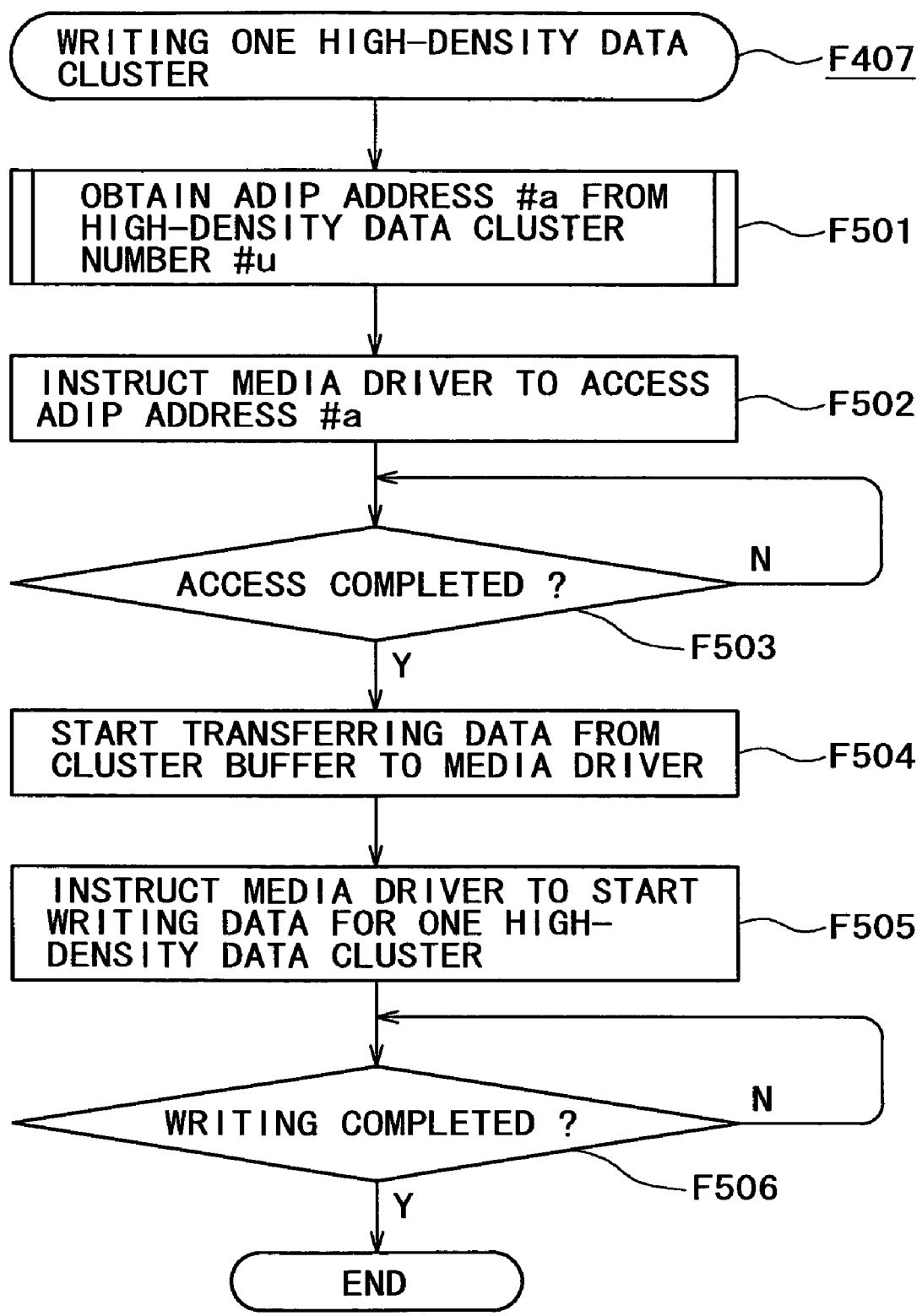
FIG. 18 is a flowchart describing the processing of writing high-density data clusters practiced as the embodiment of the present invention.

The process of step F407 is shown in FIG. 18.

First, the system controller 9 obtains ADIP address #a from high-density data cluster number #u to be written in step F501 shown in FIG. 18. The process of this step is the above-mentioned process shown in FIG. 15.

When ADIP address #a has been obtained by the process shown in FIG. 15 in step F501, then the system controller 9 instructs the media driver 2 to access ADIP address #a in step F502.

Consequently, the media driver 2 executes the access to the ADIP address #a under the control of the drive controller 31.

The system controller 9 waits for the completion of the access operation in step F503, and upon completion of the access operation, instructs the memory transfer controller 3 in step F504 to start transferring the data of high-density data cluster (#u) from the cluster buffer memory 4 to the media driver 2.

In step F505, the system controller 9 instructs the media driver 2 to write the data of that high-density data cluster to the disk 90.

In response, the media driver 2 starts writing the received data to the disk 90 under the control of drive controller 31. To be more specific, the data received from the memory transfer controller 3 are recorded through the recording system composed of the RS-LDC encoder 12, RLL(1-7) PP modulator 13, magnetic head driver 17, and magnetic head 18 (and the optical head 19).

The system controller 9 waits for the completion of the writing operation by the media driver 2 in step F506 and ends the processing upon the completion of the writing operation.

By the above-mentioned processing, the writing of the logical sector data to the disk 90 in response to a write request from the personal computer 100 is realized.

Namely, the writing on a logical sector basis is executed as the rewriting on a high-density data cluster basis to the disk 90.

9. Writing/Reading of Non-Disclosed Information

As described above, a particular high-density data cluster in the data track is a hidden data area for use in recording non-disclosed information such as disk's unique ID and hash value.

For example, if the disk drive apparatus 1 (or the connected personal computer 100) is a device licensed for rewriting this non-disclosed information, the disk drive apparatus 1 accesses the hidden data area for writing the information such as unique ID.

It is generally necessary to read the unique ID and hash value from the loaded disk 90.

For this purpose, the media driver 2 must access the high-density data cluster which is the hidden data area. In this case, the system controller 9 may determine on the basis of CAT a particular high-density data cluster number which is the hidden data, convert the obtained number into ADIP address, and instruct the media driver 2 for accessing for recording/reproducing. Namely, the read/write operation may be made by the same procedure as shown in FIG. 16 or FIG. 18.

It should be noted that CAT may be recorded to a high-density data cluster which is the hidden data area or a high-density data cluster for CAT may be arranged separately from the hidden data area. However, in any case, this high-density data cluster is outside the exportable area.

For the data track, CAT must first be read in order to grasp the configured high-density data clusters. The high-density data cluster on which CAT is to be recorded may be specified as the start high-density data cluster in the start part configuring the track, the high-density data cluster at x position from the beginning (x is a predetermined specific value), or the high-density data cluster at the end, for example.

Consequently, the high-density data cluster having CAT may be accessed by determining the ADIP address from U-TOC.

10. Linking Rules

In the above, the disk 90 and the disk drive apparatus 1 according to the present embodiment have been described. The following describes the linking rules which are required when the audio track and the data track are recorded together on the disk 90. Especially, these linking rules are required if the audio track and the data track may be recorded separately at given positions in the data area as described with reference to FIG. 2.

First, with reference to FIGS. 19A to 19C, the situation at recording the audio track (MD audio data) and the data track (high-density data) will be described.

FIG. 19A shows particular ADIP cluster N (physical (ADIP) address N). The minimum rewrite unit of MD audio data is one ADIP cluster. If recording MD audio data to physical address N, the data writing start point is a point about 24 mm afterward the start of ADIP cluster N and therefore the data writing end point is a point about 24 mm after the start of ADIP cluster N+1. These data writing start and end points are inside the link sector shown in FIG. 9A.

On the other hand, the minimum rewrite unit of high-density data is one high-density data cluster, namely ½ ADIP cluster. If recording high-density data to physical address N, the data writing start point is at approximately start (in a range about 0 mm to 2.25 mm) of ADIP cluster N as shown in FIG. 19C. The data writing end point is at approximately the center of ADIP cluster N.

Figure 20A:
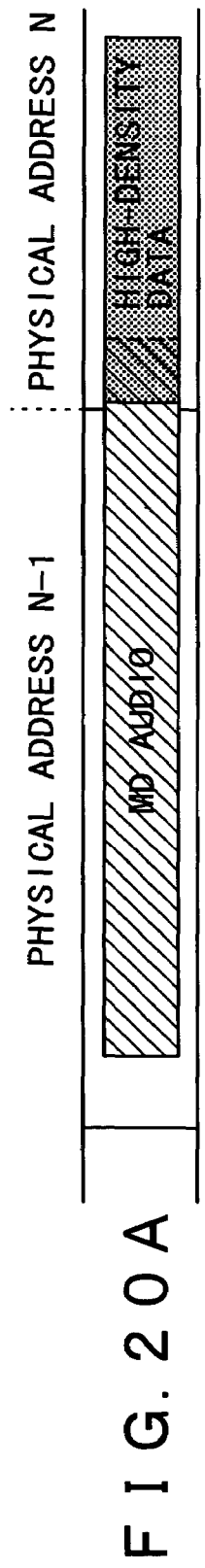
FIGS. 20A and 20B illustrate conditions of linking between the MD audio recording and the high-density data recording.
Figure 20B:
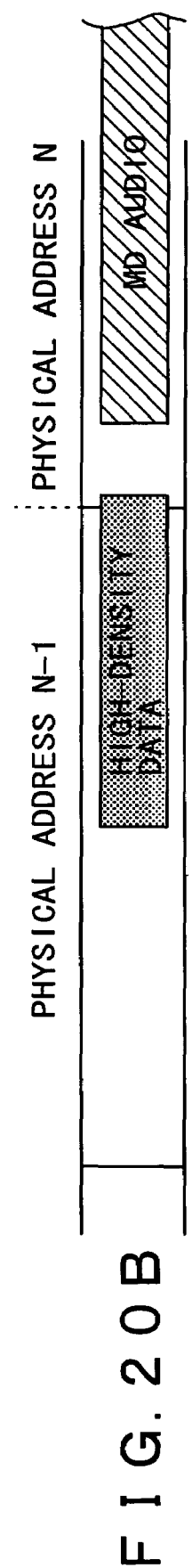

With the difference between these recording start positions considered, assume that the audio track part neighbors the data track part, then two cases shown in FIGS. 20A and 20B are possible.

FIG. 20A shows the case in which the audio track part is positioned at the lower address side and the data track part is positioned at the higher address side.

FIG. 20B shows the case in which the data track part is positioned at the lower address side and the audio track part is positioned at the higher address side.

The case shown in FIG. 20B present no serious problem, but the case shown in FIG. 20A causes the data to be overlapped at the proximity of the head of physical address N (ADIP cluster N). Namely, the data recorded beforehand are overwritten by the data recorded afterward.

To solve this problem, a guard band for ½ ADIP cluster or one ADIP cluster is arranged at the head of the part of the data track (high-density data) as shown in FIGS. 21A and 21B.

For the guard band, an offset for ½ ADIP cluster or one ADIP cluster may be given to the ADIP address obtained by the conversion process for the conversion from a high-density data cluster number into ADIP address to be executed in recording/reproducing high-density data as described with reference to FIG. 15.

By arranging the guard band as described above, if a component (a part) of the data track is to be physically continuously recorded to the end position of a component (a part) of the audio track, the recording of the part of the data track starts from a position separated from the end position of the part of the audio track by a predetermined distance (for the length equivalent to the guard band). Therefore, there occurs no data overlapping unlike the case shown in FIG. 20A, thereby realizing the coexistence of the audio track and the data track without problem.

Thus, the embodiments of the present invention have been described. It will be apparent that the configurations and operations of the recording medium, recording apparatus, and reproducing apparatus and the specific processing procedures of the recording method and reproducing method according to the invention are not restricted to the above-described embodiments and various changes and modifications thereof are possible.

For example, the configurations of the disk drive apparatus providing the recording apparatus or the reproducing apparatus are not restricted to the configurations shown in FIG. 11 and FIG. 12.

As clearly seen from the above descriptions, the present invention provides the following advantages.

Namely, in the present invention, the second management data in the management area on a recording medium manage the audio track and the data track in the data area and the data track has data and the first management data for managing these data. Consequently, the recording/reproducing of data based on the first management data such as a FAT system may be performed on the data track, thereby making the present invention adapt to general-purpose data recording applications.

Because the entire data track is managed by the second management data (for example, U-TOC in a Mini Disc system), the integrity with the audio track is provided. Consequently, the present invention allows the construction of a general-purpose data recording/reproducing system by use of a conventional media system such as an audio Mini Disc for example.

In the present invention, the audio track and the second management data are recorded as modulated by the first modulating scheme and the data track is recorded as modulated by the second modulating scheme. Consequently, the data track may employ the second modulating scheme which allows high-density recording, thereby increasing the recording capacity of the recording medium.

In addition, the audio track and the data track are modulated in different modulating schemes, so that the conventional audio equipment compatible with the audio track may be prevented from reading the data track, thereby overcoming the problem of generating abnormal sound when the data track is reproduced by conventional audio equipment.

Moreover, non-disclosed information which is out of management by the first management data is recorded. Namely, this non-disclosed information may be recorded beforehand or recorded by the recording apparatus. Consequently, the data required for copyright protection such as media-unique ID (or unique ID) and encryption-associated information may be recorded, thereby providing the compatibility with data distribution systems, which makes the present invention suitably applicable to general-purpose media systems.

As described, the present invention allows the compatibility with general-purpose data recording/reproducing by use of conventional media systems, and at the same time, allows the construction of a recording/reproducing system which satisfies the demands for the increase in storage capacity, the construction of a proper management system, the compatibility with special information recording, and the solving of problems with conventional models (recording/reproducing apparatuses).

Further, in the data area on the recording medium, the audio track and the data track may be recorded at any different positions, thereby realizing the effective use of the recording medium in accordance with actual usage forms.

Still further, in the data area, the audio track recording area in which the audio track is recorded and the data track recording area in which the data track is recorded may be set, thereby facilitating the compatibility with the recording apparatus and the reproducing apparatus. Especially, in this case, the data track recording area is set more toward the disk inner periphery than the audio track recording area, so that because, in CLV, it is shorter in rotational time on the inner periphery side than the outer periphery side, thereby making it more advantageous to record and reproduce data to be accessed more frequently than music.

If the recording medium is a disc-shaped recording medium with address recorded by molding, the data unit obtained by converting the mold-recorded address (ADIP address: physical address) by predetermined rules provides the second-modulated data, namely a rewrite unit (a high-density data cluster) of the data track, thereby facilitating the access and recording/reproducing processing based on the physical address.

Especially, the integral multiple of sector (ADIP sector) which is the mold-recorded address unit is the rewrite unit (high-density data cluster) of the second-modulated data, so that in recording high-density data to a given position, the writing may be started always with the same timing after obtaining the ADIP address from the disk.

The integral number of rewrite units (high-density data clusters) of the second-modulated data are included in the cluster (ADIP cluster) which is the mold-recorded address unit, so that the address conversion rules may be simplified, thereby in turn simplifying the circuit or software for address conversion.

If a write request specifying a logical address in the data track is made, the rewrite unit (high-density data cluster) in which this logical address is included is determined and the data are written on the basis of the determined rewrite unit. If a read request specifying a logical address in the data track is made, the mold-recorded address equivalent to that logical address is determined and the data are read from the recording medium accordingly. Consequently, the present invention allows the data recording/reproducing corresponding to the logical address specification when recording/reproducing requests are made from a personal computer and the like.

The linking rules are specified such that, when a data track component (part) is physically continuously recorded to the end position of an audio track component in the data area, the recording starts from a position away from the end position by a predetermined distance. This novel setup prevents the end position of an audio track part from overlapping the start position of a data track part, thereby preventing the data from being partially deleted.

The invention claimed is:

1. A recording medium comprising:
   a recordable area having a plurality of first clusters and being configured to record at least one first data track in the plurality of first clusters, the at least one first data track being modulated by a first modulation method, the recordable area also being configured to record at least one second data track in a plurality of second clusters of higher data density than the first clusters, the second data track being modulated by a second modulation method different from the first modulation method and including a second management data; and
   a management area configured to record a first management data for managing both of the first type of data track and the second type of data track, wherein the first management data is modulated by the first modulation method.

2. The recording medium according to claim 1, wherein the first modulation method is an EFM modulation method and the second modulation method is a 1-7pp modulation method.

3. The recording medium according to claim 1, wherein the first modulation method is applied to an ACIRC error correction method and the second modulation method is applied to an RS-LDC error correction method.

4. The recording medium according to claim 3, wherein the management area is disposed in an inner side of the recording medium and the first type of data track and the second type of data track are intermingled on the recordable area of the recording medium.

5. The recording medium according to claim 1, wherein a plurality of non-disclosed information is recorded outside an area managed by said first management data.

6. A recording apparatus for recording on a recording medium, said recording apparatus comprising:
   a first modulating device configured to modulate a first type of data track and a first management data in accordance with a first modulating scheme, and configured to output a first modulated data;
   a second modulating device configured to modulate a second type of data track, including a second management data, in accordance with a second modulating scheme different from the first modulating scheme, and configured to output a second modulated data; and
   a recording section configured to record said first modulated data and said second modulated data outputted from said first modulating device and said second modulating device respectively to predetermined positions on said recording medium.

7. The recording apparatus according to claim 6, further comprising:
   a control section configured to cause said recording section to record non-disclosed information outside an area managed by said first management data.

8. The recording apparatus according to claim 6, said recording apparatus further comprising:
   a control section configured to cause said recording means to record an audio track into an audio track recording area located on an outer periphery of a disc-shaped recording medium, and a data track into a data track recording area located on a data area in an inner periphery of the disc-shaped recording medium, and wherein said disc-shaped recording medium includes a mold-recorded address.

9. The recording apparatus according to claim 6, wherein the first modulation method is an EFM modulation method and the second modulation method is a 1-7pp modulation method.

10. The recording apparatus according to claim 6, wherein the first modulation method is applied to an ACIRC error correction method and the second modulation method is applied to an RS-LDC error correction method.

11. The recording apparatus according to claim 10, wherein the management area is disposed in an inner side of the recording medium and the first type of data track and the second type of data track are intermingled on the recordable area of the recording medium.

12. A recording apparatus for recording on a recording medium, said recording apparatus comprising:
a first modulating device configured to modulate a first type of data track and a first management data in accordance with a first modulating scheme, and configured to output a first modulated data;
a second modulating device configured to modulate a second type of data track, including a second management data, in accordance with a second modulating scheme, and configured to output a second modulated data; and
a recording section configured to record said first modulated data and said second modulated data outputted from said first modulating device and said second modulating device respectively to predetermined positions on said recording medium,
wherein said recording medium is a disc-shaped recording medium having a mold-recorded address and a data unit obtained by converting said mold-recorded address by predetermined rules is a rewrite unit for rewriting said second modulated data to be recorded by said recording section.

13. The recording apparatus according to claim 12, wherein an integral multiple of a sector which is said mold-recorded address is said rewrite unit for rewriting said second modulated data.

14. The recording apparatus according to claim 12, wherein the integral number of rewrite units for rewriting said second modulated data are included in a cluster which is said mold-recorded address.

15. The recording apparatus according to claim 12, further comprising a control section which, if a write request specifying a logical address for said data track is made, determines said rewrite unit including said logical address and causes said recording section to execute data writing in the determined rewrite unit.

16. A recording apparatus for recording on a recording medium, said recording apparatus comprising:
a first modulating device configured to modulate a first type of data track and a first management data in accordance with a first modulating scheme, and configured to output a first modulated data;
a second modulating device configured to modulate a second type of data track, including a second management data, in accordance with a second modulating scheme, and configured to output a second modulated data; and
a recording section configured to record said first modulated data and said second modulated data outputted from said first modulating device and said second modulating device respectively to predetermined positions on said recording medium; and
a control section configured to cause, if a component of said data track is physically continuously recorded to an end position of a component of said audio track in said data area, said recording section to start the recording a predetermined distance from said end position.

17. A recording method for a recording medium comprising the steps of:
modulating at least one of a first type of data track and a first management data, in accordance with a first modulating scheme to output a first modulated data;
modulating at least one of a second type of data track, including a second management data, in accordance with a second modulating scheme different from the first modulating scheme to output a second modulated data; and
recording said first modulated data and said second modulated data to a plurality of predetermined positions on said recording medium.

18. The recording method according to claim 17 comprising the step of, if a write request specifying a logical address for said data track is made, determining a rewrite unit including said logical address and writing data in the determined rewrite unit.

19. The recording method according to claim 17 comprising the step of recording non-disclosed information outside an area managed by said first management data.

20. The recording method according to claim 17, comprising the steps of:
recording said audio track to the disk outer periphery side in said data area; and
recording said data track to the disk inner periphery side in said data area, wherein said recording medium is a disc-shaped recording medium having a mold-recorded address.

21. The recording method according to claim 17, wherein the first modulation method is an EFM modulation method and the second modulation method is a 1-7pp modulation method.

22. The recording method according to claim 17, wherein the first modulation method is applied to an ACIRC error correction method and the second modulation method is applied to an RS-LDC error correction method.

23. The recording method according to claim 22, wherein the management area is disposed in an inner side of the recording medium and the first type of data track and the second type of data track are intermingled on the recordable area of the recording medium.

24. A recording method for a recording medium comprising the steps of:
modulating at least one of a first type of data track and a first management data, in accordance with a first modulating scheme to output a first modulated data;
modulating at least one of a second type of data track, including a second management data, in accordance with a second modulating scheme to output a second modulated data; and
recording said first modulated data and said second modulated data to a plurality of predetermined positions on said recording medium,
wherein said recording medium is a disc-shaped recording medium having a mold-recorded address, and a data unit obtained by converting said mold-recorded address by predetermined rules is a rewrite unit for rewriting said data modulated by the second modulating scheme.

25. The recording method according to claim 24, wherein an integral multiple of a sector which is said mold-recorded address is said rewrite unit for rewriting said data modulated by the second modulating scheme.

26. The recording method according to claim 24, wherein the integral numbers of rewrite units for rewriting said second data modulated by the second modulating scheme are included in a cluster which is said mold-recorded address.

27. A recording method for a recording medium comprising the steps of:
modulating at least one of a first type of data track and a first management data, in accordance with a first modulating scheme to output a first modulated data;
modulating at least one of a second type of data track, including a second management data, in accordance with a second modulating scheme to output a second modulated data; and
recording said first modulated data and said second modulated data to a plurality of predetermined positions on said recording medium; and
if a component of said data track is physically continuously recorded to an end position of a component of said audio track in said data area, starting the recording a predetermined distance from said end position.

* * * * *